United States Patent
Busby et al.

(10) Patent No.: US 12,145,167 B2
(45) Date of Patent: Nov. 19, 2024

(54) METHODS OF APPLYING A RAPID CURE SEALANT TO AN AIRCRAFT SURFACE

(71) Applicant: THE PATENT WELL LLC, Fort Worth, TX (US)

(72) Inventors: Jeff Busby, Millsap, TX (US); Kent Boomer, Aledo, TX (US); Matt Boyd, Fort Worth, TX (US); Michael Dry, Fort Worth, TX (US); Peter Sibello, Benbrook, TX (US); Chad Knight, Dodd City, TX (US); Kelly Templin, Granbury, TX (US)

(73) Assignee: The Patent Well LLC, Fort Worth, TX (US)

( * ) Notice: Subject to any disclaimer, the term of this patent is extended or adjusted under 35 U.S.C. 154(b) by 517 days.

(21) Appl. No.: 17/304,142

(22) Filed: Jun. 15, 2021

(65) Prior Publication Data
US 2022/0266275 A1 Aug. 25, 2022

Related U.S. Application Data

(63) Continuation of application No. 16/146,318, filed on Sep. 28, 2018, now abandoned, and a
(Continued)

(51) Int. Cl.
*B05B 7/04* (2006.01)
*B05B 7/24* (2006.01)
(Continued)

(52) U.S. Cl.
CPC ............ *B05B 7/0408* (2013.01); *B05B 7/241* (2013.01); *B05B 7/2472* (2013.01); *B05B 7/2489* (2013.01); *B05B 7/32* (2013.01); *B64C 1/00* (2013.01); *B65D 83/202* (2013.01); *B65D 83/68* (2013.01); *B05B 7/0093* (2013.01); *B05B 7/065* (2013.01); *B05B 7/068* (2013.01);
(Continued)

(58) Field of Classification Search
CPC ........................................................ B05D 1/02
See application file for complete search history.

(56) References Cited

U.S. PATENT DOCUMENTS

| 7,928,160 B2* | 4/2011 | Senkfor | C08G 18/6674 |
| | | | 524/590 |
| 2012/0183692 A1* | 7/2012 | Becker, IV | C09D 201/005 |
| | | | 427/428.01 |

OTHER PUBLICATIONS

Spray Gun Techniques—A complete Guide published online at www.sprayfinishingsolutions.com on Jul. 17, 2014.*

* cited by examiner

*Primary Examiner* — Vu A Nguyen
(74) *Attorney, Agent, or Firm* — Daniel Chapman; Jack V. Musgrove

(57) ABSTRACT

Applicant discloses a novel method of spray applying multiple courses of a rapid cure, two part polymer sealant to an aircraft surface. The method sometimes uses a two part polymer mix for use in the aircraft industry that is applied with pneumatic mix and spray gun. The two part cartridge is used in the mix and spray gun so the mix is applied immediately upon mixing, but the two components are kept separated unless the gun is applying the mix. The multiple courses cure to form a clear sealant that allows for inspection of cracks and corrosion beneath the sealant. It cures quickly so that the coated part may be further processed, for example in the assembly line during aircraft build. Applicant further discloses multiple spray gun systems for applying such a two-part polymer mix to aircraft parts.

17 Claims, 38 Drawing Sheets

Related U.S. Application Data continuation-in-part of application No. 15/472,859, filed on Mar. 29, 2017, now Pat. No. 10,507,478.

(51) Int. Cl.
  *B05B 7/32* (2006.01)
  *B05D 1/02* (2006.01)
  *B05D 1/34* (2006.01)
  *B64C 1/00* (2006.01)
  *B65D 83/20* (2006.01)
  *B65D 83/68* (2006.01)
  B05B 7/00 (2006.01)
  B05B 7/06 (2006.01)
  B05B 7/08 (2006.01)
  B05B 15/55 (2018.01)
  B05C 9/04 (2006.01)
  B05C 17/015 (2006.01)

(52) U.S. Cl.
  CPC ........... *B05B 7/0815* (2013.01); *B05B 7/2421* (2013.01); *B05B 15/55* (2018.02); *B05C 9/04* (2013.01); *B05C 17/015* (2013.01); *B05D 1/02* (2013.01); *B05D 1/34* (2013.01)

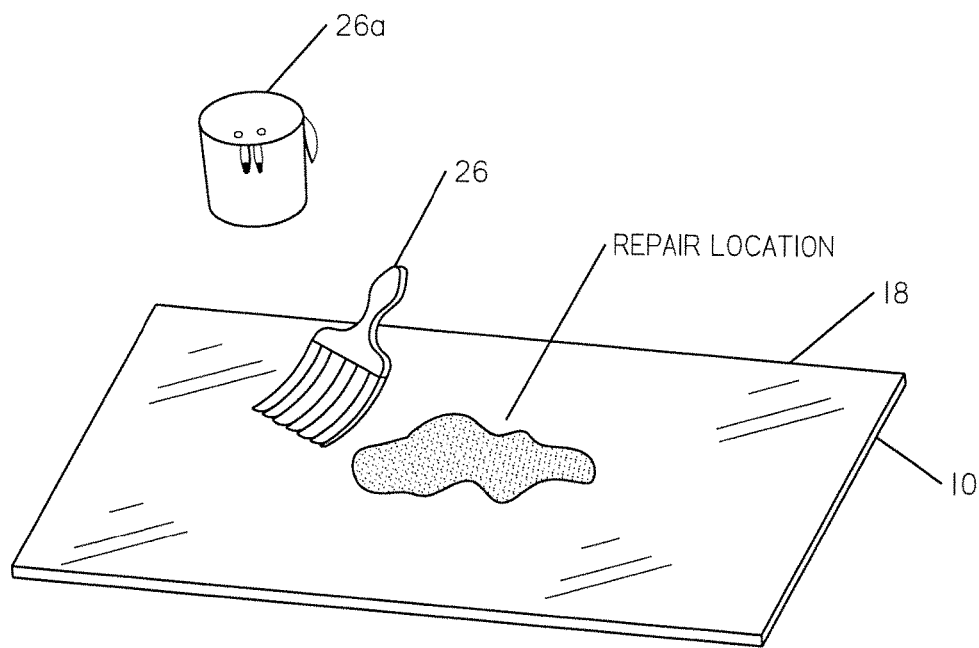
Fig. 1A
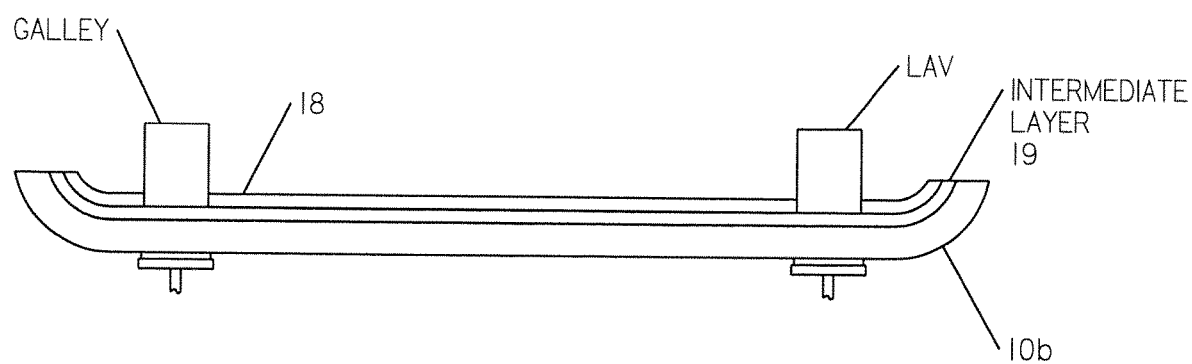
Fig. 5A1

METHODS OF APPLYING A RAPID CURE SEALANT TO AN AIRCRAFT SURFACE

This application is a continuation of, and claims the benefit of, copending application Ser. No. 16/146,318, which, in turn, is a continuation-in-part patent application that claims the benefit of, priority to, and incorporates herein by reference co-pending US Publication No. 2017-0282196, U.S. application Ser. No. 15/472,859, published Oct. 5, 2017; which claims the benefit of U.S. Application 62/315,361, filed Mar. 30, 2016; and U.S. Application No. 62/409,652, filed Oct. 18, 2016; this application claims the benefit of and priority to and incorporates herein by reference U.S. Application 62/564,766, filed Sep. 28, 2017; U.S. Application 62/566,172, filed Sep. 28, 2017; U.S. Application 62/658,857, filed Apr. 17, 2018; and U.S. Application 62/663,036, filed Apr. 26, 2018. This application herein incorporates by reference U.S. patent application Ser. No. 15/472,859, filed Mar. 29, 2017, and U.S. Patent Application No. 62/565,766, filed Sep. 28, 2017, and U.S. patent application Ser. No. 15/472,859, filed Mar. 29, 2017.

FIELD OF THE INVENTIONS

Sealants and sealant coatings for aircraft parts, and devices for applying sealants more specifically, a clear, thin, watertight two-component, in some embodiments, pneumatically mixed and applied polymer coating system that will dry and cure relatively quickly when applied to an aircraft part. Sealant coatings for aircraft parts, more specifically, in some embodiments, an elastomeric, watertight two-component injector-mixed and applied polymer coating system that will dry and cure relatively quickly to form a clear sealant coating when applied to an aircraft part. Spray assemblies for applying the two-part polymer mix, including aerosol and compressed air systems, some of which are portable.

BACKGROUND OF THE INVENTION

Aircraft operate in a harsh environment as they are subject to thermal and pressure cycling as well as a changing variety of moisture conditions. Sealants may be provided to prevent corrosion and protect aircraft parts. However, because of the unique environment an aircraft operates in, especially one that files at high altitudes, finding suitable environmental sealants, for example, to prevent moisture from harming an aircraft surface, is often difficult. A proper sealant must have a combination of properties effective for a number of purposes, but must also be easily and quickly prepared and applied so that there is a minimum of downtime.

At present, most prior art sealants suffer from a variety of shortcomings. It is an object of Applicant's present inventions to provide a useful, quick acting sealant suitable for aircraft parts, especially aircraft interior parts, that will be effective in the harsh environment to which the parts are subject yet will be easy to apply and allow for easy inspection (for cracks and the like) of the coated parts. It is another object of Applicant's invention to provide for devices and methods of applying aircraft sealants.

SUMMARY OF THE INVENTION

Broadly speaking, the inventions disclosed herein relate both to a two-part, cure in place sealant for use in or on aircraft parts that cures quickly and cures clear and systems to apply the sealant to aircraft parts. The inventions relate to the compositions themselves, being two-part polyurethanes, polyureas or hybrids, and the properties thereof. Some or all of these properties include at least: clarity (going on and cured), cure time, hardness, viscosity, peel strength, flammability properties (toxicity, flame retardant, and smoke density), and resistance to degradation when exposed to aircraft fluids (Jet A and/or hydraulic fluids).

Other aspects of Applicant's inventions relate to the methods of and devices for applying these two-part sealants to aircraft work pieces. These methods and devices include batch mixing the two parts in a container for later (albeit before the mix cures) applications, for example by brush, to an aircraft part. These methods and devices may also include the use of a two-part applicator that keeps the two parts of the two-part sealant separate then simultaneously mix the two components and apply the mix to the aircraft part.

Of the later, mix and apply devices are those that use a mixing straw (which "folds" the two components together multiple times). The compartments engage the mixing straw to receive and mix the two components immediately upon the application of a force to a forcing element that pushes on the two components. The forcing element may be hand operated (manual) or driven by compressed air or electrically driven. Also, in the category of simultaneous "mix and apply," devices are spray guns that have a nozzle that mixes by impingement, such as a fusion gun, or a nozzle that provides compressed gas to an uncured mix to create a spray. A fusion gun uses air pressure to drive a first stream of an atomized first sealant component and a second stream of a second component together to be mixed and ejected together as an atomized two-component spray for application to and curing upon on an aircraft surface.

Of the former, the two components of the sealant may be batch mixed (as opposed to mix and apply) and placed in a container from which they may sit and be subsequently applied, by brush, for example. Of course, the mix is curing as it sits in the container, so one cannot wait too long to apply it and best mixes small batches.

Applicant's spray system may include a cartridge, a container or containers adapted to keep the two parts separate and also for receiving a force that can move the two parts to a mixing member. The mixing member may be part of the cartridge or container or separate. The mixing member may be a mixing straw, in some embodiments, with compressed air at a tip or a nozzle, such as an impingement nozzle of a fusion gun.

The source of the force may be compressed gas, electrical or manual. The source of compressed gas may be a compressor or a compressed gas container, or a compressor acting on a fluid container.

The spray system may include a small gun, that is hand held, for aiming an uncured mixed spray from the gun to an aircraft surface. The gun may carry the cartridge or fluid container or the cartridge or fluid container may be removed and remote from the gun.

The spray system may be portable, having at least a small gun that is free to move in small, confined areas. The gun may be a self-contained (having all the parts needed for spraying hand held) and/or portable system and may include a small gun with other parts of the system remote from the gun and attached to the gun with air and/or fluid lines. Sometimes a portable system includes some or all non-gun components carried on a backpack or belt or on a hand truck.

In one embodiment, Applicant provides a two-component polyurethane, polyurea or polyurea/polyurethane hybrid mix that may be sprayed on and provides, when cured, a watertight, flexible sealant that is clear to allow for inspection of the coated material (the part, workpiece or substrate) without removal of the sealant coat. The two-component system demonstrates excellent adhesion to itself (cohesion), sufficient adhesion to the base, and allows for easy removal when necessary.

A polyurea elastomer mix or coating may be one derived from the reaction product of an isocyanate component and a resin blend component. The isocyanate can be aromatic or aliphatic in nature. It can be monomer, polymer or any variant reaction of isocyanates, quasi-prepolymer or a prepolymer. The prepolymer or hybrid system quasi-prepolymer can be made of an amine-terminated polymer resin, or a hydroxyl-terminated polymer resin.

The resin blend may be made up of amine-terminated polymer resins and/or amine-terminated chain extenders. The amine-terminated polymer resins will not have any intentional hydroxyl moieties. Any hydroxyls are typically the result of incomplete conversion to the amine-terminated polymer resins. The resin blend may also contain additives or non-primary components. These additives may contain hydroxyls, such as pre-dispersed pigments in a polyol carrier. Normally, the resin blend will not contain a catalyst(s). There are no polyols, or hydroxyl terminated materials, used as the main reactive resin in the resin blend portion of a two-component polyurea elastomer system. If so, then these would be classified as a polyurea/polyurethane hybrid system.

Polyurea/polyurethane hybrid mixes can be defined as the result of a chemical reaction between an isocyanate and a mixture of polyol and amine reactants. These formulations generally provide an "intermediate" polyurea that displays many of the same properties of a polyurea in addition to some of the properties of a polyurethane. In coating formulations, hybrids generally contain a polyether/polyester polyol and a primary amine resulting in a chemical backbone comprised of amine and hydroxyl functionality.

The sealant coating may be mixed and applied in a number of ways: with a brush, straw mixed before application, nozzle mixed and/or meter mixed before application. The components are, in a preferred embodiment, processed by specialized plural component equipment, which may develop high pressure for spray application. The two components may be mixed inside the impingement tip of a spray gun or may be mixing straw of the cartridge of the mix and spray gun.

The sealant coating is, in a preferred embodiment, free of voc (volatile organic component) and solvent free. The sealant, in some embodiments, may be mixed 50/50 by volume. In some embodiments, the coating gels and is, in some embodiments, dry hard in about 30 minutes or under (or 100 minutes or less or, in other embodiments, 180 minutes or less) and, upon cure, has peel strength between about 0.5 and about 35 pounds per inch width. The sealant coating, when fully cured, may have a hardness between about 20-80 Shore "A" at 77° F. or, in a preferred range of about 30-70 or in a most preferred embodiment about 40-60. The sealant coating may be applied, in some embodiments, to a thickness (cured) between about 3 to 30 mil. The coating may be applied in one or multiple layers, each layer formed by a separate pass of an applicator, such as a mix and spray gun.

In one embodiment, the sealant coating consists essentially of a clear, bubble-free, cured, two-component polyurea system. In another embodiment, the coating consists essentially of a clear, bubble-free, cured, two-component polyurethane system. In another embodiment, the coating consists essentially of a clear, cured, bubble-free hybrid polyurethane/polyurea system. Consists essentially means that there are no additional additives or parts that materially affect the sealant or clarity properties or dry time of the system. Any of these two component systems may be applied to only one surface of a piece of an aircraft part having two pieces. The first piece may comprise a clean dry, aluminum alloy.

A cartridge assembly for applying a sealant coating is disclosed, the cartridge assembly for use, in some embodiments, in a pneumatic mix and spray gun, the cartridge assembly comprising: a body having a first compartment and a second compartment, the first compartment containing a first part of a sealant mix, the second compartment containing a second part of the sealant mix, the body dimensioned to engage the mix and spray gun, forcing elements, in some embodiments, comprising pistons and a mixing straw engaged to the compartments, the mixing straw configured to receive and combine the two parts and emit a sealant mix, under pressure, from a tip at a removed end thereof to form a clear, cure in place, sealant coating on a workpiece, the clear sealant polymer coating being one of a polyurea, polyurethane or hybrid coating.

An aircraft part is disclosed for use on the interior of an aircraft, the aircraft part comprising: a first piece and a second piece, each piece having a piece surface, wherein at least one piece surface has a clear, elastomeric, VOC-free sealant coating, the sealant coating formed from a two component polyurea/polyurethane/hybrid mix, combined, in some embodiments, 50/50 by volume, with a hard dry time of less than about 30 minutes, the sealant coating with a peel strength between about 0.5 and 35 piw and a cured hardness of between about 20-80 Shore "A" at 77° F., and a thickness of between about 3 to 30 mil.

The cartridge assembly used for applying the clear sealant coating may have two compartments and a mixing straw to immediately mix and apply the two component mix. The sealant mix and the sealant coating formed from the drying or curing of the sealant mix may have a number of characteristics, including clarity; in some embodiments, optically clear and, in some embodiments, visually clear. The mix may be free of volatile organic components sulfur and silicon. The sealant coating may be Jet A fuel resistant, aircraft hydraulic fluid resistant, flame retardant, and have, in some embodiments, a specific gravity of less than 1 (mean low density) or, in some embodiments, less than 0.97. The sealant mix displays good adhesion to an aluminum alloy workpiece, in the range of about 0.5 to 35 pounds per inch width and good cohesion. The viscosity of the sealant mix prior to gelling may be between about 150 and 1500 cps or less than 4000 cps as mixed and sprayed. In one embodiment, the sealing coat consists essentially of a two component polyurea system and, in another, a two component polyurethane system and, in another, a two component hybrid polyurea/polyurethane system.

A system for applying an atomized spray comprising a two-part, cure in place sealant coating is disclosed, in some embodiments, the system comprising: a spray gun having a body and a nozzle, the body with a handle, a gas inlet port, a fluid inlet port, compressed air channels, fluid channels, a valve assembly for controlling air and fluid flow from the air inlet port and the fluid inlet port to the nozzle, and a trigger engage the body to; a fluid container having a first compartment and a second compartment, the first compartment containing a first part of a sealant mix, the second compartment containing a second part of the sealant mix; a mixing straw engaged between the spray gun and the fluid container configured to receive separately and then mix under pressure the two sealant parts, the mixing straw connected at a removed end to the fluid inlet port of the spray gun, a source of compressed air, the source of compressed air for engaging the air inlet port of the spray gun; and means to move a first part of the sealant mix and the second part from the fluid container through the mixing straw to the spray gun.

A system is disclosed, in some embodiments, for applying an atomized spray comprising a two-part, cure in place polyurea or polyurethane clear on and clear curing sealant coating, the system comprising a spray gun having a cartridge assembly with two cylinders, two pistons, and two piston rods; and a means for producing a force and apply the force to provide the same rate of travel to each of the pistons; wherein the forcing means includes a battery driven electric motor and a drive system, or compressed gas from a compressed gas source.

In a method for repairing scuffed or abraded sections of an aircraft part "in situ", Applicant uses the guns disclosed, in some embodiments, portable guns, to apply to an otherwise sealed part without removal of the part from the aircraft. The clear on/clear to dry polyurethane and polyurea components sued in in situ repairs in conjunction with the portable guns achieve convenience to the user.

In particular embodiments, Applicant provides a two-component polyurea or polyurea/polyurethane hybrid mix that may be applied through a manual injector and that provides, when cured, a watertight, flexible sealant. In certain implementations, the sealant may be clear to allow for inspection of the coated material (the part, workpiece, or substrate) without removal of the sealant coat. The two-component system demonstrates excellent adhesion to itself (cohesion), sufficient adhesion to the base, and allows for easy removal when necessary (e.g., due to the cohesion being stronger than the adhesion).

An aircraft part is disclosed comprising: an aluminum or aluminum alloy first piece, the first piece having a first piece surface, wherein the first piece surface has an elastomeric sealant coating formed from a two component, room temperature, chemically cured, fast drying, sulfur free, polyurea/polyurethane/hybrid mix.

BRIEF DESCRIPTION OF THE DRAWINGS

FIG. 1A illustrates use of clear sealant for repair of an aircraft part.

FIG. 5A1 illustrates the use of a sealant coat over an intermediate layer.

DETAILED DESCRIPTION OF THE PREFERRED EMBODIMENT

Figure 1:
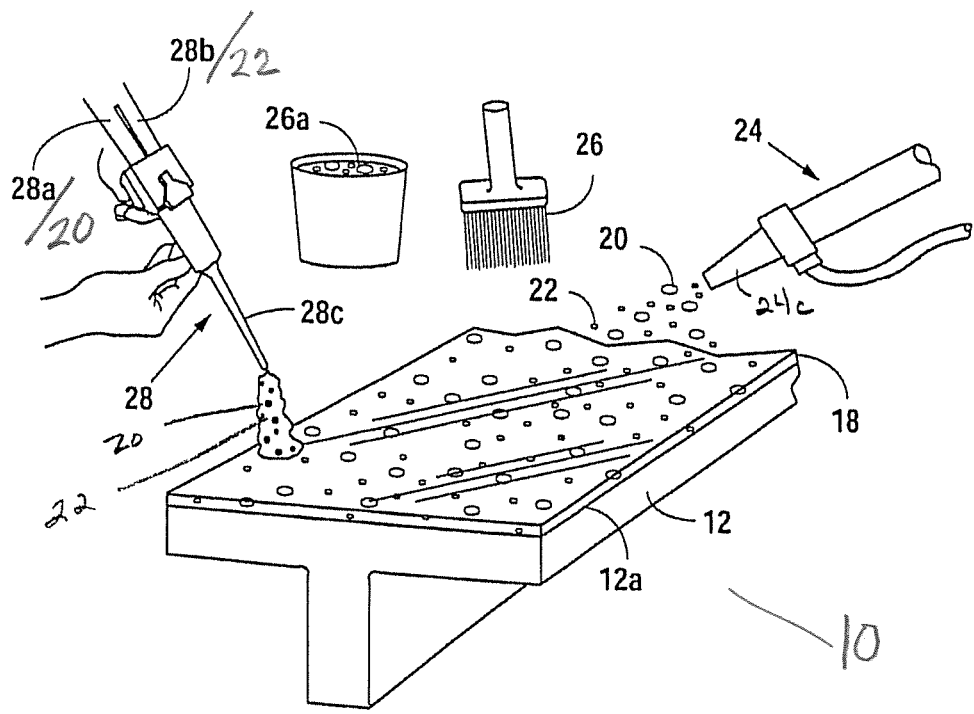
FIG. 1 illustrates in perspective view a coated aircraft piece and methods and devices for applying the sealant coating thereto.

FIGS. 1, 1A, 2, 3, 4, 5, 5A, 5A1, and 5B illustrate an aircraft part 10 comprising at least a first piece 12, which first piece 12 may have a first surface 12a, shown in FIG. 1, as a horizontal surface. One or more of the surfaces of first piece 12 may be at least partially coated with a moisture proof sealant coat or coating 18 comprising, in some embodiments, a two-component, room temperature chemically cured, clear, elastomer layer. The two components may be a first component 20, such as a resin blend, and a second component 22, such as an isocyanate (or hardener) component, the two components mixing and curing on a surface to form the sealant coating, which is typically cure in place (for example, on an aircraft part) and, in one embodiment, a polyurea coating, another embodiment a polyurethane coating, and a third embodiment a hybrid coating. The foregoing may be collectively referred to as polyurea/polyurethane/hybrid coating.

In the sealant coating, second component 22 can be an isocyanate which can be an aromatic or aliphatic in nature, a monomer, polymer or any variant reaction of isocyanates, quasi-prepolymer or a prepolymer. The prepolymer or quasi-prepolymer can be made of an amine-terminated polymer resin, or a hydroxyl terminated polymer resin (for a hybrid polyurea/polyurethane system).

First component 20 may be a resin component made up of an amine terminated polymer resin and/or amine terminated chain extenders. The amine terminated polymer resins will not have any intentional hydroxyl moieties. In a polyurea or polyurea/polyurethane hybrid system(s), the resin blend will typically not contain any catalysts.

Figure 7:
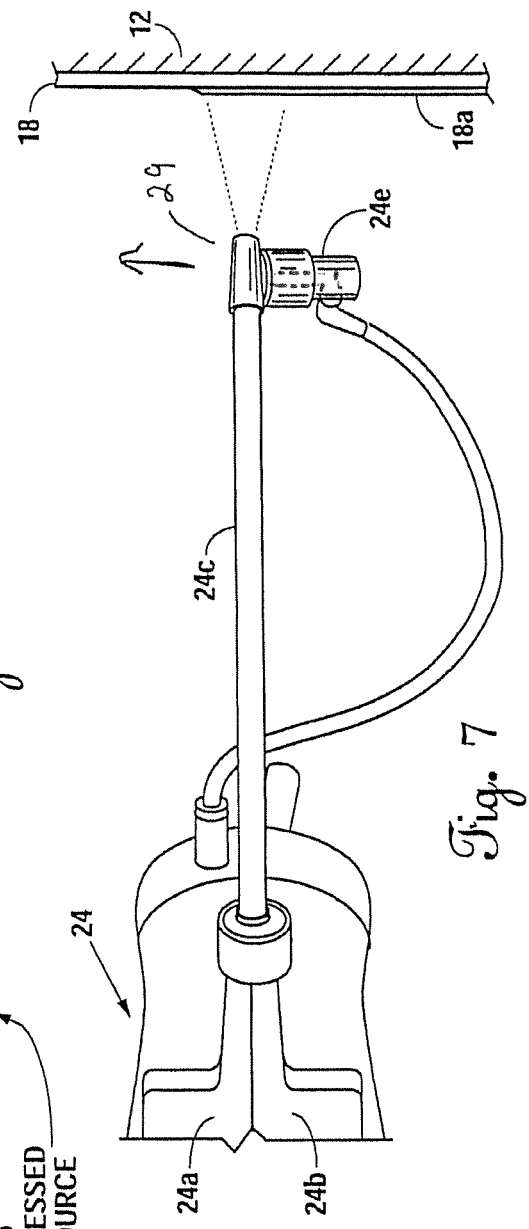

Sealant coating 18 may be a polyurea/polyurethane/hybrid coating, but will be, in the preferred embodiment, relatively fast curing to a clear coating having one or more layers (see FIG. 7, layer 18a). The term "clear" means that the coating, at least when cured on a workpiece surface, allows an inspector to see, with the unaided eye, cracks, corrosion or defects in the workpiece surface. The terms "visually clear" and "optically clear" refer to the sealant coat passing the specific tests set forth below. Clear does not exclude some color or tint in the coating. Indeed, in some embodiments, it may be beneficial that the sealant coat may be tinted or undergo tint changes during cure.

Figure 6:
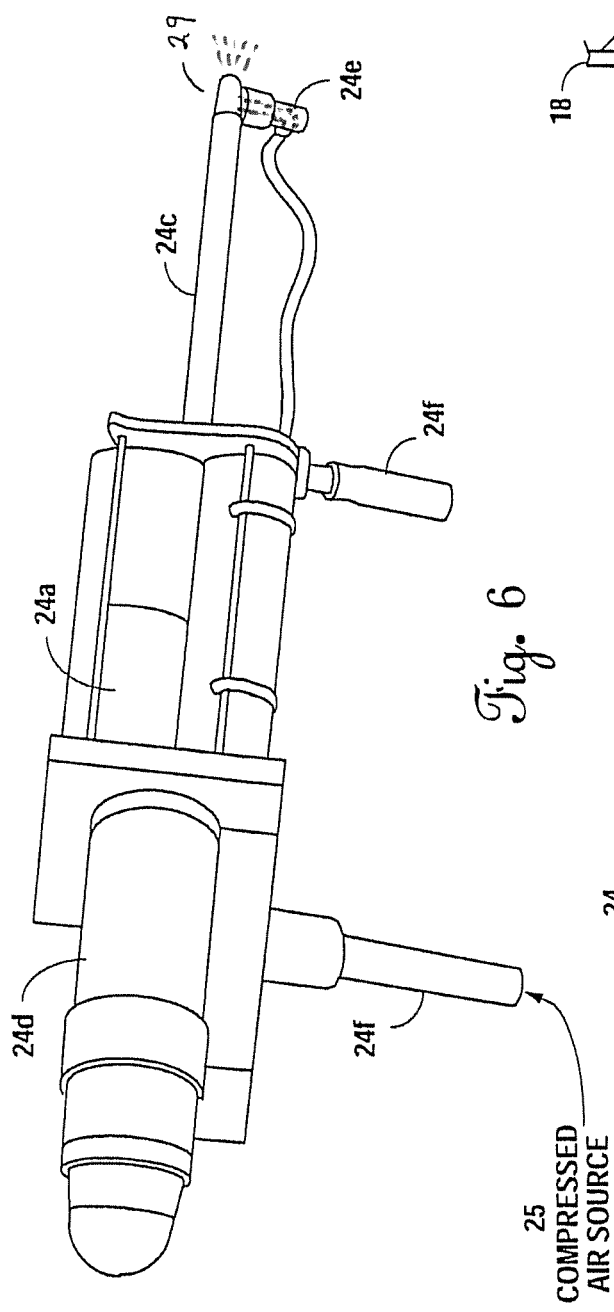
FIGS. 6 and 7 illustrate the use of a pneumatic air gun with a mixing straw for applying Applicant's two-part system to a substrate, such as an aircraft piece.
Figure 15:
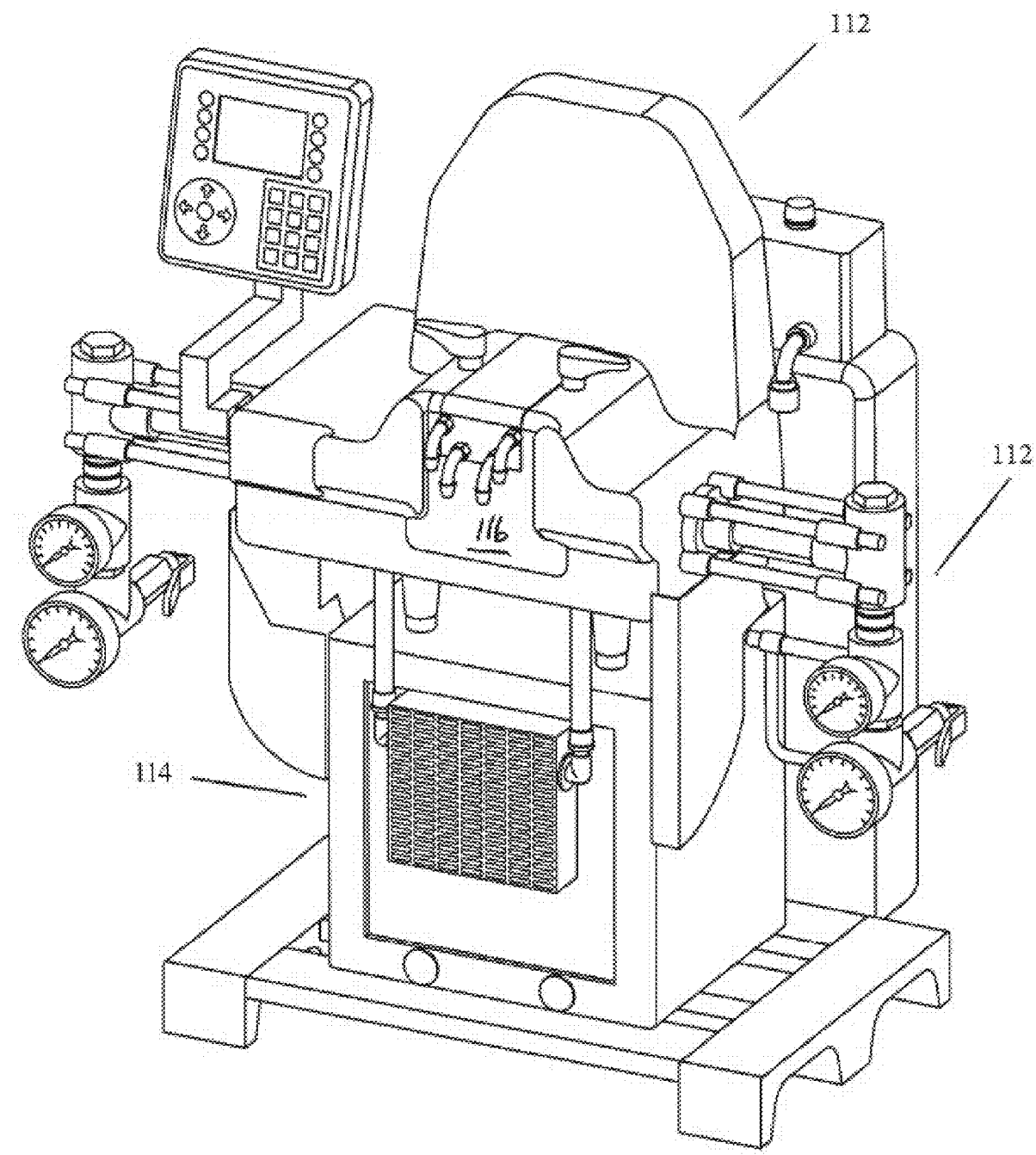
FIG. 15 illustrates a hydraulic fixed ratio metering and delivery system for use to deliver two components of a mix to a spray gun.
Figure 16:
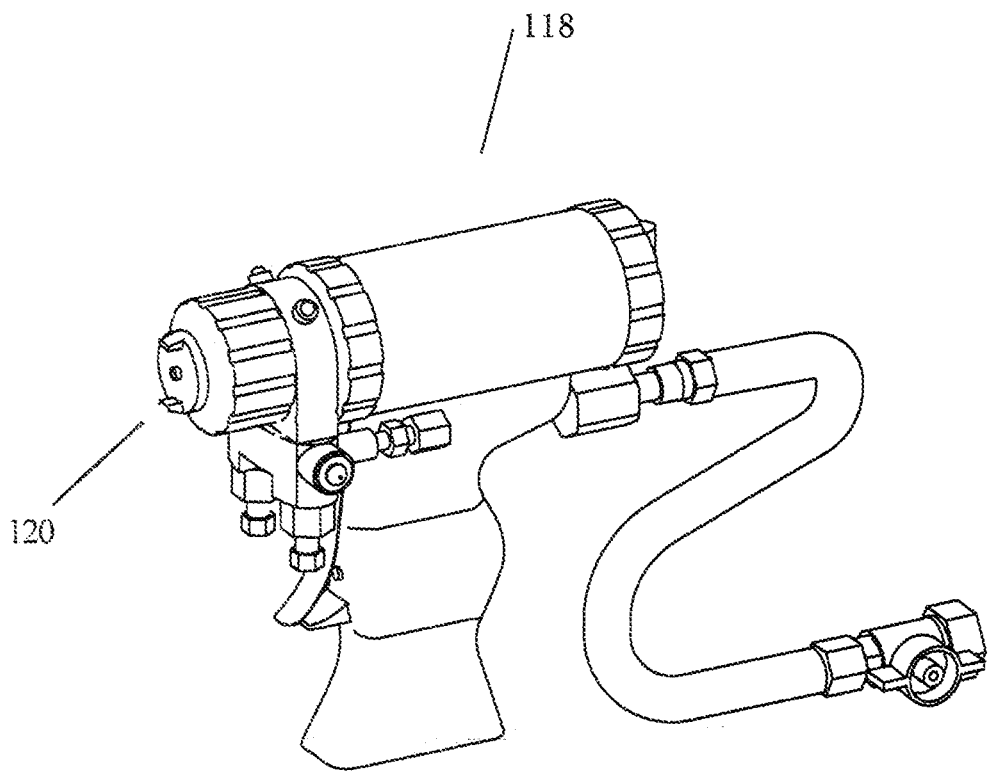
FIG. 16 illustrates an air purge fusion gun for impingement mixing of the two parts to form an aerosol spray.
Figure 17:
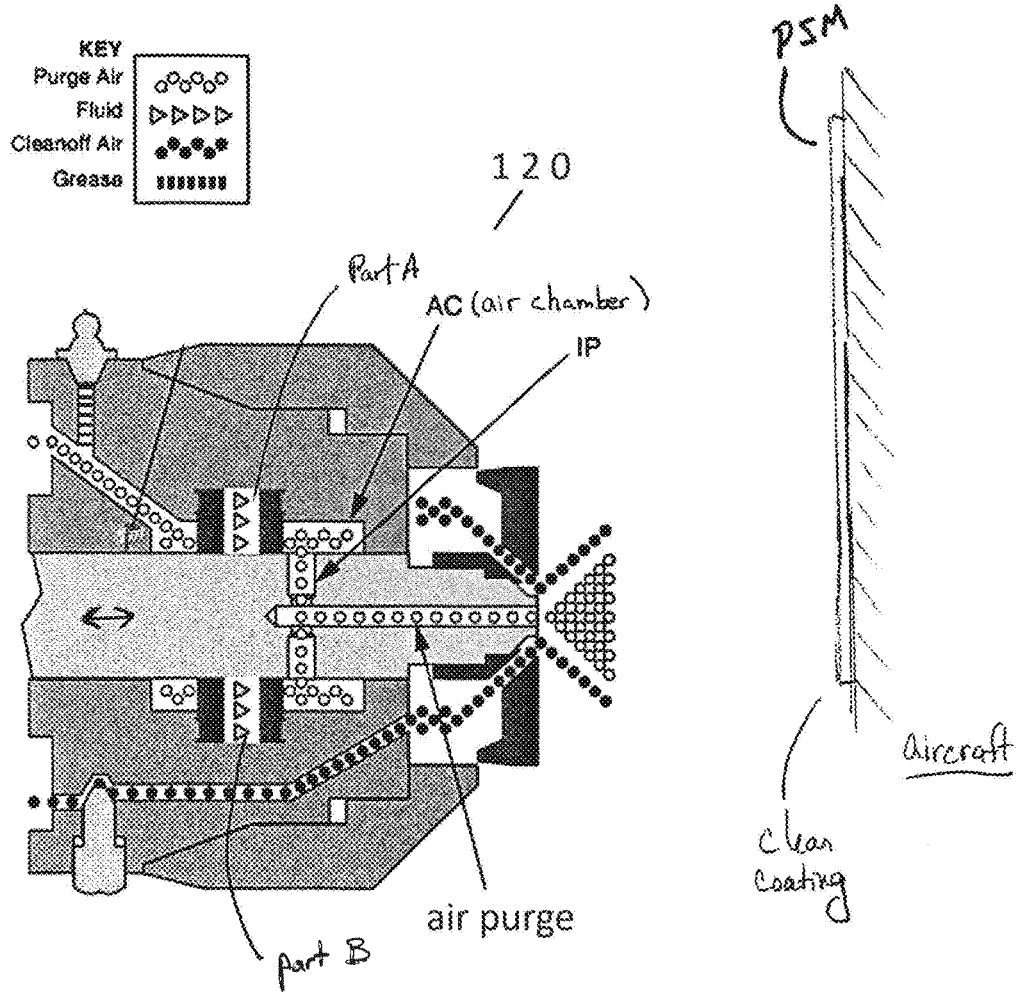
FIGS. 17 (purging) and 17A (mixing and spraying) illustrate details of the n through a mixing straw and also providing compressed gas at a tip of a mixing straw for atomizing a spray.
Figure 17A:
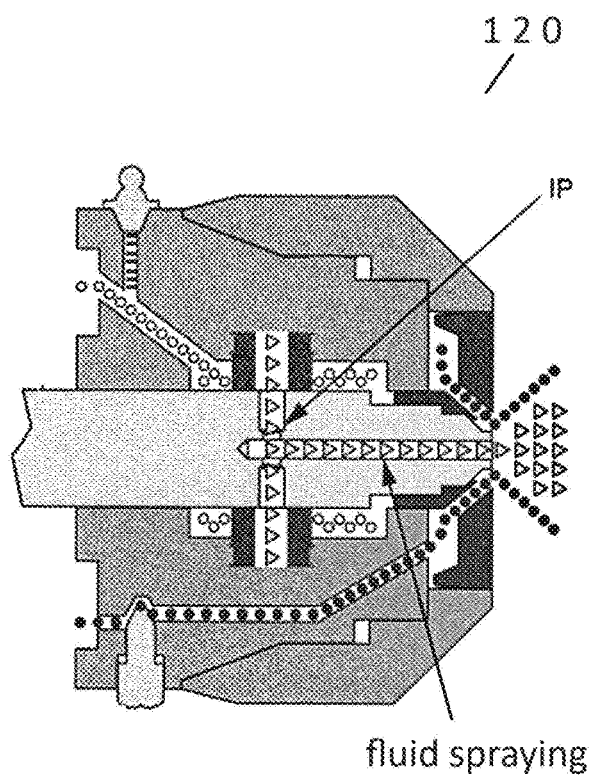

Applicators 24/26/28 include preferably a pneumatic mix and spray gun 24 (having a cartridge 27 with a body with two compartments 24a/24b for the two components 20/22, see FIG. 6), roller or brush 26, manual flow mix dispenser 28 (having two compartments 28a/28b for mixing in straw 28c (manual), see FIG. 15). Mix applicators 24/28 maintain the two components 20/22 in separate compartments, as in first compartment/second compartment 24a/24b of pneumatic mix spray gun 24 (typically airless or air assisted) as seen in FIGS. 6 and 7 or compartments 28a/28b. A mixing straw 24c/28c may be provided for mix applicators. Spray gun 24 may have a compressed gas compartment 24d to receive compressed gas from a compressed gas source 25, with gas port 24e on a removed tip 29 of mixing straw 24c. Small batch mixing may be done in a container 26a when application is by brush or roller 26 and gel time, such that the mix can be applied to a workpiece before it sets up (thickens) in the container.

FIG. 1A illustrates that Applicant's sealant coat 18 may be applied at a repair location where, for whatever reason, the sealant coat is removed or missing and the repair location leaves unprotected substrate. Here, a container with Applicant's sealant coat 18 in a mixed, but unapplied condition, is provided with brush 26, which allows manual application of the sealant coat to the repair location.

Figure 2:
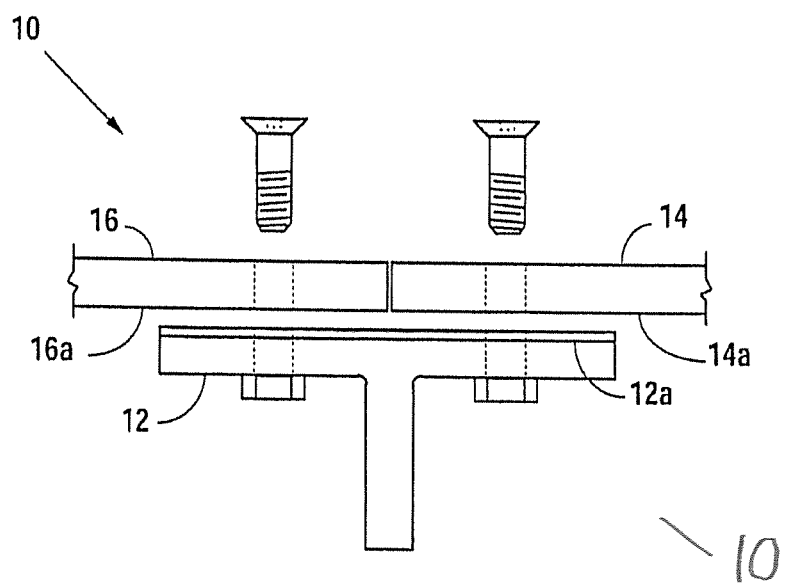
FIG. 2 illustrates an elevational view of an aircraft assembly comprising multiple pieces, at least some surfaces of some of the pieces being coated.
Figure 3:
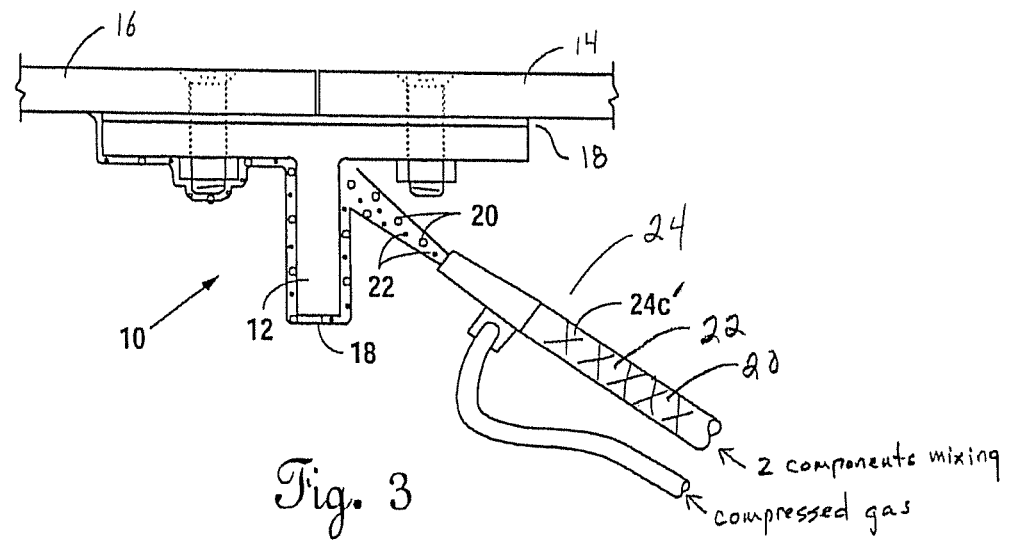
FIG. 3 illustrates a side view of the application of a sealant coating to an aircraft part, more specifically, a floorboard assembly comprising a floorboard support with floorboards attached thereto.

Turning back to coated aircraft parts 10, FIG. 1 illustrates first piece 12, in this particular embodiment, first piece 12 being a support member for an aircraft interior floorboard system comprising, typically, two or more floorboards 14/16 (see FIG. 2). FIG. 1 illustrates that a first surface 12a first piece 12 may be coated with sealant coat 18 prior to assembly. FIG. 3 illustrates that other surfaces of an aircraft part or piece may be coated, here after assembly, for example, after attaching of floorboards 14/16 and applying compression to the sealant coating, typically after it is dry hard (under about 100 minutes) or after it has substantially cured (to about 80-95% final hardness), which may be about 0.5 hours to 4 hours. Sealant coat 18 may be under compression between a first and second piece 12/14, in one embodiment first surfaces 12a and 16a (see FIG. 2). Compression may be applied between first piece 12 and second piece 14 (for example, floorboard support/floorboard), and a third piece 16 (another floorboard support/floorboard). The multiple pieces may comprise a multi-piece aircraft part, such as a floor assembly, with the elastomeric moisture-proof coating 18 serving as an effective sealant between parts under compression and/or as an outside coating on a piece or parts.

Turning to FIG. 3, an embodiment of an aircraft comprises part of first piece 12 that is not under compression, wherein the first piece is engaged with second and/or third pieces, the three pieces comprising an aircraft part 10 having at least a coating on at least a portion of a surface, including an outer surface, of at least one of the pieces. The sealant provides a moisture proof barrier to prevent or inhibit corrosion.

Figure 4:
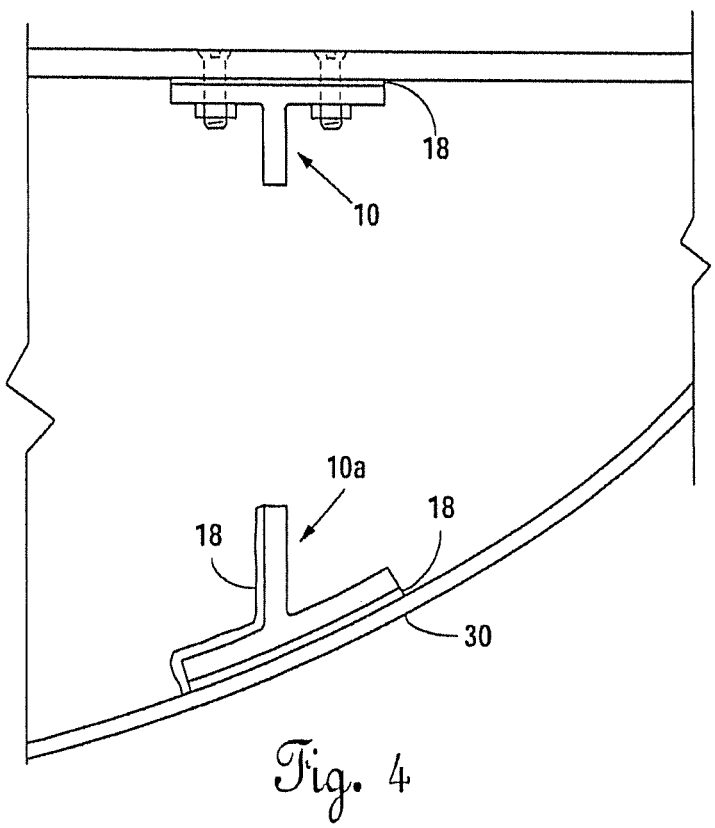
FIG. 4 illustrates in side view a portion of an aircraft interior comprising floorboards, frame stringers and skin, and the use of Applicant's coating therewith.

FIG. 4 illustrates an aircraft part comprising a frame stringer 10a and an aircraft skin 30, wherein coating 18 is provided on faying surfaces between skin 30 and stringer 10a as seen in FIG. 4, which cured sealant coating is under compression. It is also seen in FIG. 4 that sealant coating 18 may be covering at least a portion of the aircraft part (such as an outer surface) that is not under compression.

Figure 5:
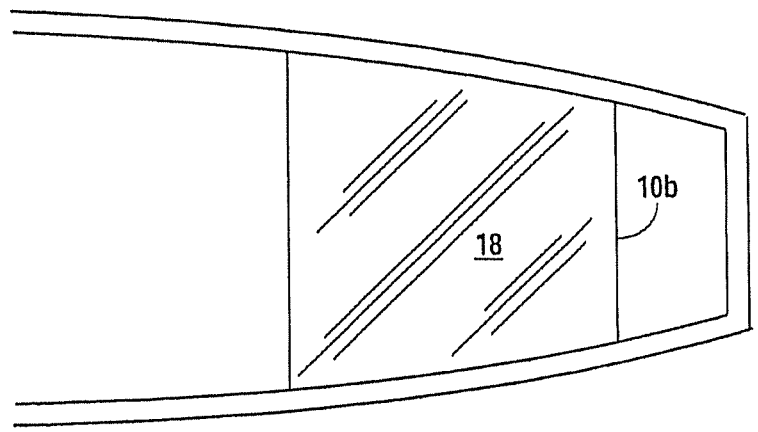
FIG. 5 illustrates a top view of an aft floor or cargo pan or aft galley pan of an aircraft, such as a Boeing 757, and the use of Applicant's sealant coating covering the floor and between support structure in the floor.
Figure 5A:
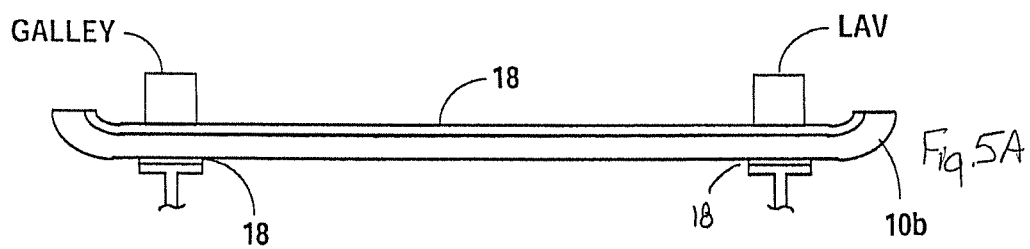
FIG. 5A illustrates FIG. 5 in cross-section and illustrates some of the places in which Applicant's sealant coating may be used with an aft galley pan.
Figure 5B:
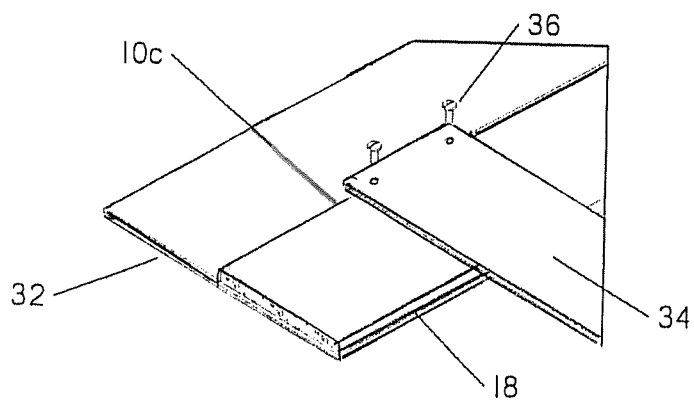
FIG. 5B illustrates a perspective view of aircraft fuselage panels forming a lap joint with Applicant's sealant coating between the mating surfaces.

FIGS. 5 and 5A illustrate the use of sealant coating 18 on the aft floor or cargo pan 10b on an aircraft, for example, a Boeing 767. Here, the surfaces coated may include one or more of: top surface of the pan, below the lay and galley, and between the pan underside and topside of a pan support member. FIG. 5B illustrates a lap joint 10c with Applicant's coating 18 between facing and mating surfaces, under compression, when fasteners, such as rivets 36, attach adjacent aircraft panels where they overlap, here, outer skin panel 32 and adjacent outer skin panel 34.

Figure 5C:
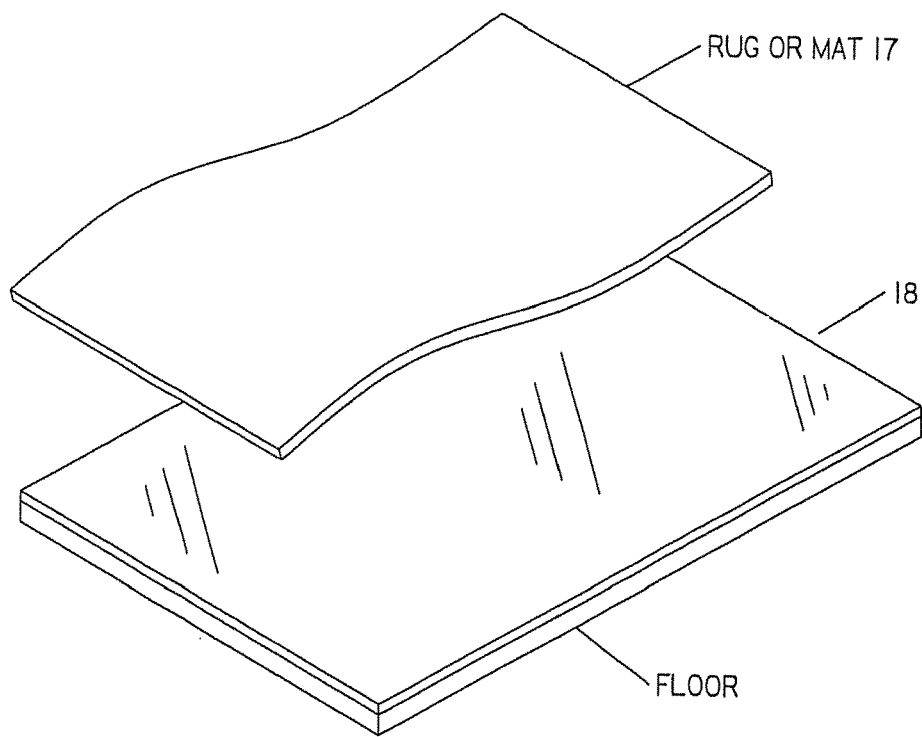
FIG. 5C shows Applicant's sealant between a top surface of a floor and a floor covering.
Figure 5D:
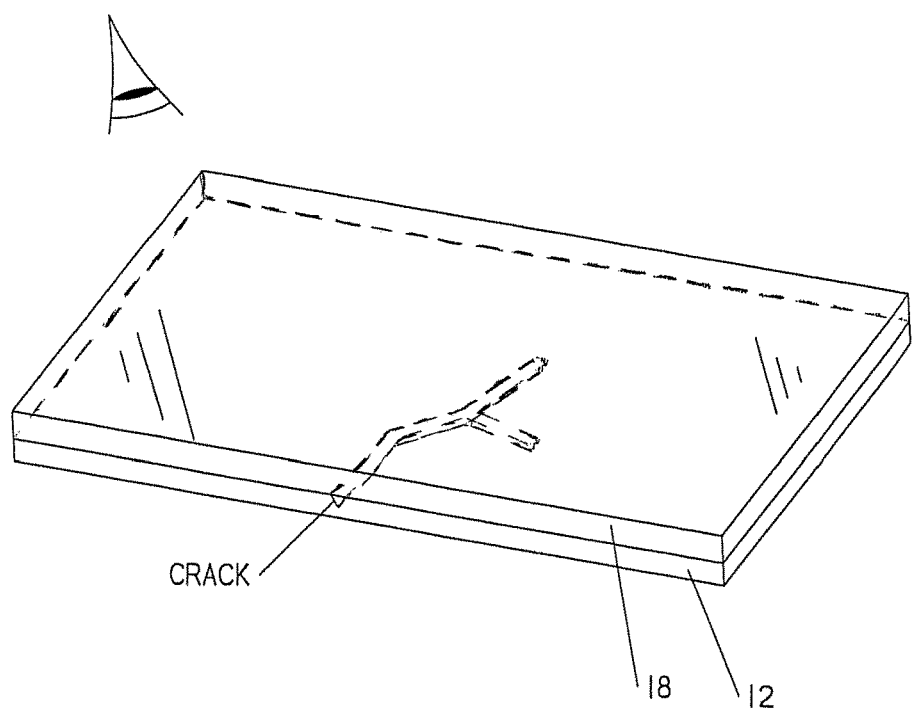
FIG. 5D illustrates the clarity of Applicant's coating and the ability to see cracks or corrosion therethrough.
Figure 5E:
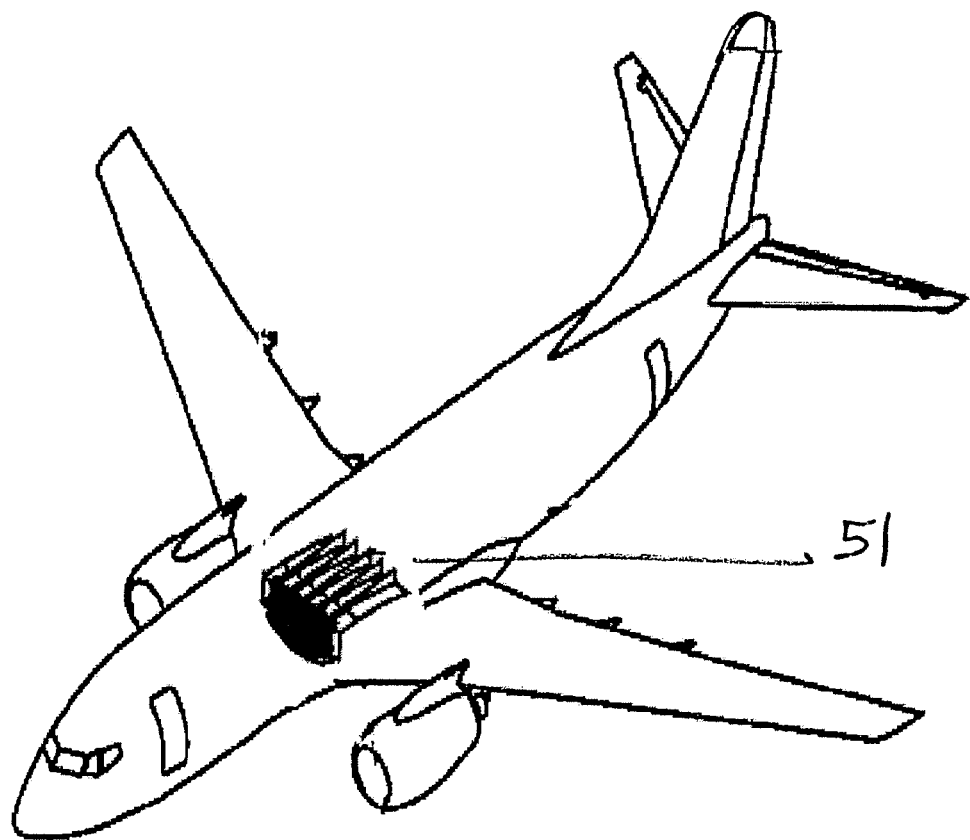
FIG. 5E illustrates another location that is suitable for application of Applicant's sealant coat.

FIG. 5C shows Applicant's sealant coat 18 used over an aluminum floorboard 14/16 in an aft galley or other location of an aircraft. A rubber cover or other floor covering 17 or other flexible member is applied on top of Applicant's sealant coat and the floor covering is used as the surface that people actually walk on. The use of Applicant's sealant 18 between the floorboard and the floor covering, such as a rubber cover or rug, provides both an environmental sealant and a durable somewhat resilient base for ease of walking or standing.

FIG. 5A1 illustrates an intermediate layer between a substrate, here, for example, cargo pan 10b, and sealant coat 18. Intermediate layer 19 may be a corrosion inhibiting compound (CIC), such as an Alodine® coating. Alodine® is an international brand name of Henkel Technologies Conversion, an anodizing and functional coating suitable for use on aluminum, magnesium, and other non-ferrous alloys. These coatings provide improved corrosion protection and paint adhesion. Intermediate layer 19 may also be a primer or paint. Applicant's sealant coat 18 should be applied after the immediate layer or substrate is clean, dry and, if there is an intermediate layer, fully cured. All SF products are available from AvDEC® as set forth herein.

The sealant coating in a preferred embodiment is non-opaque or clear; in a most preferred embodiment optically clear or visually clear, so as to view any potential cracks, corrosion or fatigue that may occur on the coated parts. The coated parts, in one embodiment, may be an aluminum alloy, such as 2024, 6061 or 5056 or any other suitable alloy.

The compositions of the present invention may be applied to a variety of substrates, including, in addition to those set forth above: aluminum, aluminum alloy, carbon fiber reinforced plastics, and other composites. The sprayable composition of the present invention can be applied directly onto the surface of a substrate or over an under layer or previously applied coating.

Two preferred embodiments of a two component 20/22 (resin, hardener) mix capable of forming an optically or visually clear sealant coat 18 are available from KBS Chemical Company, Dodd City, Texas, Part No. SF2470 Sprayable Sealant or Part No. SF2387. These are two-component systems, a hybrid/polyurethane/polyurea system designed for use as a flexible, watertight sealant. They may be used on mating surfaces under compression or outer surfaces on one or more pieces of an aircraft part, typically an interior aircraft part. Its initial, pre-cured low viscosity allows it to be sprayed. In one embodiment, SF2470 is a two-component, voc free, polyurea mix for use as a durable watertight sealant that is supplied in a two-part cartridge for use with a Sulzer or similar mix and spray gun as set forth herein. Because of its clarity, it provides easy visibility for inspection purposes long after the original application. The resin and hardener are both amber in the cartridge and mix under pressure in the static mix straw. They may be applied on horizontal or vertical surfaces. The resin may have a pre-mixed viscosity of between about 1,000 to 1,800 cps at 77° F. and the hardener (isocyanate) premixed may have a viscosity between about 250 to 550 cps. The mix may gel and dry to the touch in about 15 minutes or less (preferably in about 20 mins. or less, at 77° F.) at between 40° F.-100° F. and in about 3.0 hours or less it reaches a hardness of about 40-60 Shore A. Unexpectedly, even at lower temperature in this 40° F.-100° F. range, the dry time remains about 2.5 hours or less. The working life after mixing is about 4 minutes. In one embodiment, peel strength is between about 23 and 27 piw and the service temperature is about −85° to 185° F. Dryhard and dry through time is about 1.50 hours (or less) at 72° F. The coating is typically durable enough to walk (dry through) on without damaging in about one hour to an hour and a half or less. In this way, a product such as an aircraft piece or an aircraft part may be placed in service fairly quickly. Salt fog testing (ASTM) the KBS materials on aircraft interior surfaces (aluminum coupon) shows no visible corrosion present after 3000 hrs. In a preferred embodiment, such as that found in the SF2470 coating, the reaction product mix ratio by volume is 50:50, with the resin viscosity (pre-mix) about 750 to about 1300 cps, the resin may be the first component 20 and the isocyanate (hardener viscosity pre-mix) about 180 to about 275 cps may be the second component 22. This coating passes flame retardant test without the addition of known flame retardant agents (12 second vertical burn per 14 CFR 25 Subpart D, § 25.853a, Appendix F, Part I(A)(1)(ii). While SF2470 has none of the following FR (flame retardant) powders, they may be added to any of the mixes disclosed herein to the extent they do not destroy clarity.

In some embodiments, Applicant's two-part polymer for use as a watertight, clear, injectable sealant is provided from AvDEC as Part No. SF2387, which is supplied in a two-part cartridge for manual application and is Jet A fuel resistant, but may be used anywhere in the aircraft interior. Gel time is less than about 12 minutes at 77° F. for a 100 g mass. Dry through time is, in some embodiments, about 1.5 hours at 75° F. and dry hard time is about 180 minutes at 75° F., in some embodiments, 100 minutes or less and, in some embodiments, 30 minutes or less. The product will full cure in under 24 hours at 77° F. The cured hardness, in some embodiments, will be between about 55-80 Shore A. The tensile strength is between about 400-600 psi, and the maximum elongation is between about 500%-700%. Adhesion (peel strength), in some embodiments, is between about 10-30 piw on bare Al 6061, 90° peel back, in other embodiments, 2-10 piw.

AvDEC Part No. SF2387 is supplied in a two-part cartridge for use with a Sulzer or similar mix and spray gun as set forth herein, and is especially helpful for use as a sprayable fuel tank sealant (it is Jet A fuel resistant), but may be used anywhere in the aircraft interior. This product is 100% non-volatile with a mix viscosity of 7500 cps or less and a pot life of about 0.07 hrs. Resin viscosity is 1,000-1,800 cps and isocyanate is 250-550 cps. It will gel in under 12 minutes and full cure in under 24 hours (77° F.). Adhesion (peel strength) is good at about 25 piw.

The preferred viscosity of the mix immediately upon mixing is between about 150 and about 1500 cps, and a preferred gel time (of 10 gram mass 77° F.) is between about 8 to about 14 mins. In one application, a coating thickness is provided between about 3 to 30 mil established in one pass of an applicator and is allowed to gel (about 8 to 14 mins.). In another application, a second layer 18a, also between about 3 and about 30 mil, may be applied, with a second pass of an applicator as seen, for example, in FIG. 7. An about 5 to 7 mil is typically the maximum thickness applied in a single pass without sagging on a clean, dry, vertical aluminum alloy surface (sprayed on with Sulzer Mixpac MixCoat Spray Gun, in one embodiment, modified with compressed gas port 24e on tip 29 of the mixing straw to break up the mix into small particles. Typically HVLP dispensers or air spray guns will not be used, rather airless or air assisted spray equipment may be used.

The flame retardant is not particularly limited but a halogen-free flame retardant which does not produce a toxic halogen gas, is preferable and, for example, known flame retardants free of halogen atom such as hydrated metal compound based flame retardants, inorganic compound based flame retardants, phosphorus flame retardant, silicone flame retardant, nitrogen compound based flame retardants, organic metal compound based flame retardants and the like can be used.

Examples of the hydrated metal compound based flame retardant include aluminum hydroxide, magnesium hydroxide, calcium hydroxide and the like. Examples of the inorganic compound based flame retardant include antimony compound, zinc borate, zinc stannate, molybdenum compound, zinc oxide, zinc sulfide, zeolite, titanium oxide, nano filler (montmorillonite (MMT), nano hydrated metal compound, silica), carbon nanotube, calcium carbonate and the like.

Examples of the phosphorus flame retardant include phosphates, aromatic condensed phosphates, ammonium polyphosphates and the like. Specific examples of the phosphate include triphenyl phosphate, tricresyl phosphate (TCP), cresyl diphenyl phosphate (CDP), 2-ethylhexyldiphenyl phosphate, triethyl phosphate (TEP), tri-n-butyl phosphate, trixylenyl phosphate, xylenyl diphenyl phosphate (XDP) and the like. Specific examples of the aromatic condensed phosphate include resorcinol bisdiphenyl phosphate, bisphenol A bis (diphenyl phosphate), resorcinol bisdixylenyl phosphate and the like. Specific examples of the ammonium polyphosphate include ammonium polyphosphate (APP), melamine-modified ammonium polyphosphate and coated ammonium polyphosphate.

Examples of the silicone flame retardant include dimethylsilicone, amino-modified silicone, epoxy-modified silicone and the like. Examples of the nitrogen compound based flame retardant include hindered amine compounds, melamine cyanurate, triazine compounds, guanidine compounds and the like. Examples of the organic metal compound based flame retardant include copper ethylenediaminetetraacetate, calcium perfluorobutanesulfonate and the like.

Av-DEC Part No. SF5387 is supplied in a two-part cartridge for use with a Sulzer or similar mix and spray gun as set forth herein. It is another clear, two-part, sprayable fuel tank sealant comprised of a polyurea, polyurethane or hybrid that is fast drying and suitable for the aircraft interior; for aircraft interior parts, including a fuel tank sealant, further including a secondary vapor barrier. The non-volatile content is about 75%, with a 25% volatile component that is exempt per 40 CFR Chapter 1, Subchapter C, Part 51, SubpartF/Section 51.100. The mix viscosity is about 550 cps, and the pot life is about 10 to 12 mins. It will dry hard at 75° in about 30 mins. or less and dry through at 75° in about 30 mins. or less. Adhesion is good at about 25 piw. SF5387 may be mixed in a volume ratio of about 3:1 (Part A: Part B) and have a tensile strength above 200 psi. The resin is generally clear in color and has a specific gravity of around 0.98 at 72° F., the hardener is transparent amber and has a specific gravity of around 0.91 at 72° F., and the mix is transparent amber and has a specific gravity of around 0.97 at 72° F.

While SF2470 can be used on horizontal or vertical surfaces, the SF2387 and SF5387 may be easier to use on vertical surfaces, and both of the latter have resistance to degradation by Jet-A fuel. Fuel resistance means that the cured sealant has at least 5 piw (preferably at least 15, most preferably at least 25) after 168 hours of exposure to Jet-A fuel at 70° F.

TS 1228 from AvDEC is a polyurethane, with gel in 4-12 minutes, may be sprayed on or injectable. It is flame retardant. It is resistant to Jet-A and Skydrol resistant. It's dry and dry thru times are in the ranges of the other products. It dries to a hardness Shore A of 45-65.

All four products are clear, two-part sprayables that are quick drying, having fast dry hard and fast dry through time compared to the prior art. Both dry hard (thumbprint)/dry through (thumbprint and turn) times are performed in accordance with FED-STD-141. These advantages provide for faster assembly time for an aircraft, especially where larger areas of the aircraft are covered. Moreover, all of these sealants may be applied to aluminum or aluminum alloy substrate, and have a sufficient temperature service range and clarity along with sufficient tensile strength for use on aircraft undergoing repeated thermal cycling.

The product gels quickly upon mixing, such that it can be used even on vertical surfaces, as set forth herein, without "running." Applicant's two-parts are, in some embodiments, both sulfur-free and free of a catalyst and, in a preferred embodiment, solvent-free. The composition of the present invention is particularly suitable for airless or air assisted (not HVLP) spraying, even when substantially or completely free of voes. In some embodiments, the specific gravity of the mix is between 1.0 or 0.97 or less, where most prior art sealants are greater than 1.0.

Dry hard is dry, such that the sealant has already gelled and will not leave a thumbprint pressed at about 6 lbs. Thus the coated surface can be handled and, therefore, speeds up time on the assembly line. Dry through means the thumb is rotated 90° while pressing and the material shows no loosening, detachment wrinkling or other distortion of the film occurs (see FED-STD-141 method 4061.3 for both).

The present composition may include colorants to the extent they could not impair clarity. Such colorants may include pigments, dyes or tints, such as those used in the paint industry or listed in the Dry Color Manufacturers Association. The colorant could be in the form of a dispersion, including, but not limited to, an amount of particle dispersion.

A hardness after 2-6 hours (about 80-95% full cure hardness) of between about 30 and about 70 Shore "A" has been found to be suitable for most aircraft applications (or a final hardness of about Shore "A" 40 to 80 after 78 hours or more). Likewise, a peel strength of between about 5 and about 35 lbs. per inch width on a clean, dry 6061 aluminum alodine coated substrate at about ⅛" thickness (90° peel back) has provided satisfactory adhesion under the use as indicated. In a preferred embodiment, sealant coating 18 is elastomeric and may have a tensile strength of between about 100 and 200 psi or, in one embodiment, about 140 psi, and elongation of about 200% or in the range of about 100-400%.

As used herein, the term "optically clear" refers to a sealant coating that has a luminous transmittance of at least 85% and a haze no greater than 5% as measured using the method shown in ASTM D1003-07. With this method, measurements are made in the 400 to 700 nanometer wavelength range. In some embodiments, the luminous transmittance is equal to at least about 88%, at least 90%, at least 91%, at least 92%, or at least 93%. The haze is no greater than 4, no greater than 3, no greater than 2, or no greater than 1%. Some exemplary sealant coatings have a haze no greater than 3% and a luminous transmittance equal to at least 85% as measured using method ASTM D1003-07. Other exemplary coatings have a haze no greater than 2% and a luminous transmittance equal to at least 85% as measured using method ASTM D1003-07. Not all materials that are visibly clear are considered to be optically clear. That is, visible clarity is not always synonymous with optical clarity. A material that is visibly clear or clear may have a haze value greater than 5, a luminous transmittance value less than about 85%, or both. In one embodiment, the coating is optically clear (meaning has optical clarity).

Figure 9:
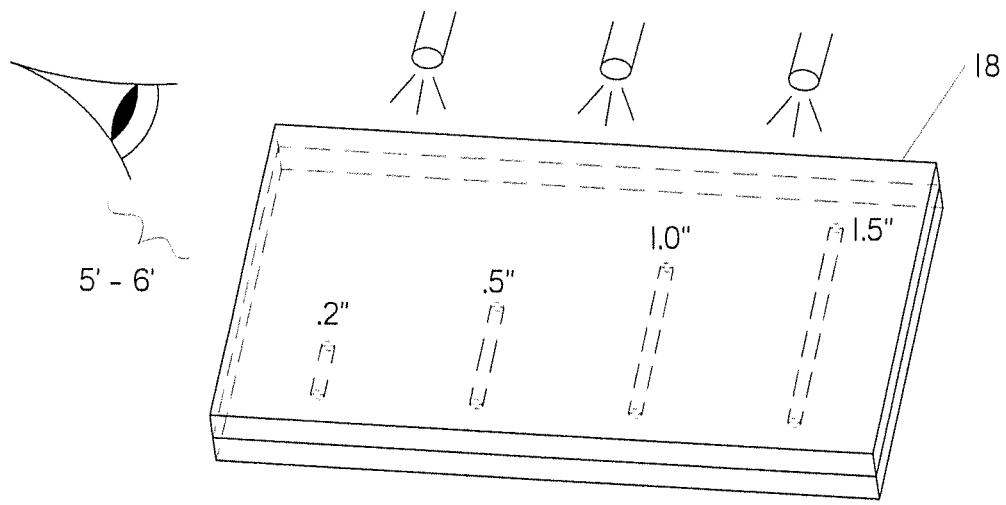
FIG. 9 illustrates a test for visual clarity of a sealant coat.

Another test (see FIG. 9) for clarity involves placing four 50 AWG tungsten wires (lengths=0.2 inch, 0.5 inch, 1 inch, 1.5 inch) on a test panel and coating the panel with the sealant about 0.040" thick. After cure, one may visually examine (assuming 20/20 vision) to determine the minimum length of wire that is visible from about 5-6 feet away under normal lab light conditions (100 to 1000 lumens). The shortest wire should be visible. Applicant's coating as set forth should pass at least this test, and passing this test refers to visible clarity or visually clear. In some embodiments, Applicant's mix should pass this test immediately upon application and through to full cure.

Moreover, the sealant from application through full cure, in one embodiment, is always visibly clear and/or optically clear though it may be tinted. As such, user may visually inspect the sealant and the underlying workpiece for air bubbles, debris, corrosion, cracks in the workpiece, etc.—even when it is immediately applied, and minutes, hours, days, weeks or months later.

Pieces placed under compression may be placed together following full cure, or between gel and full cure, or between immediate application and gel time, the latter two conditions may generate better adhesion to the uncoated piece.

Figure 8:
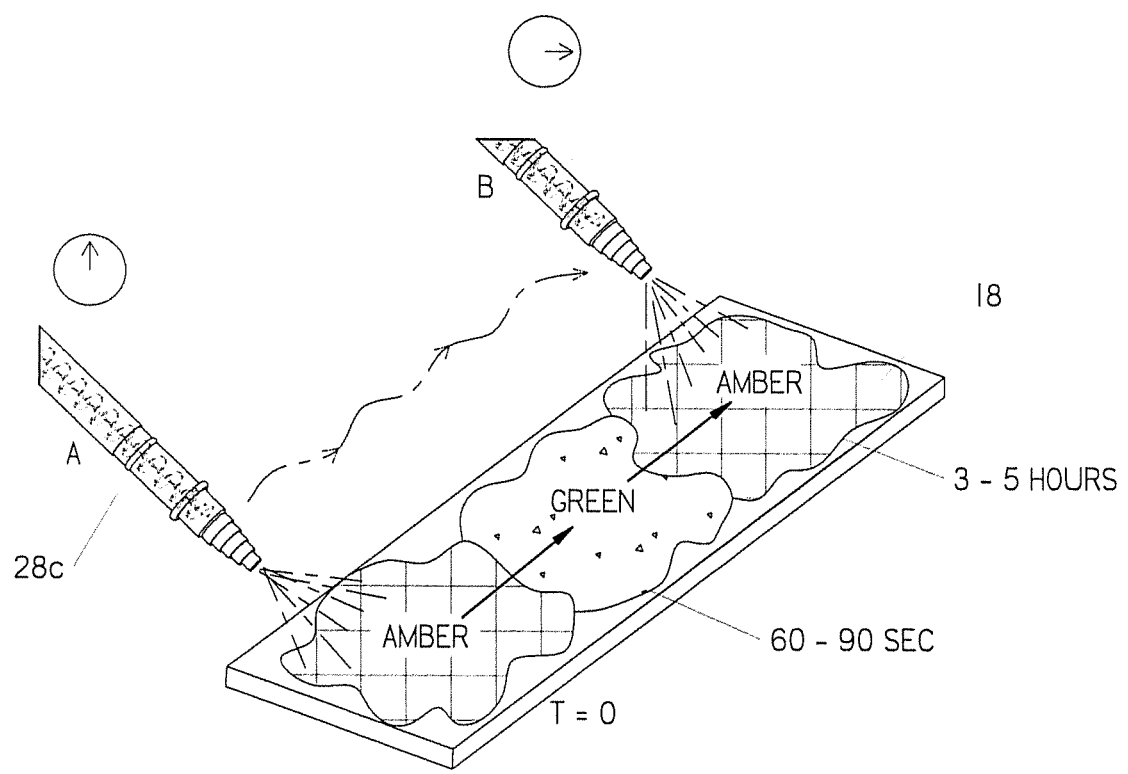
FIG. 8 illustrates a preferred embodiment of a sprayable sealant undergoing a color change after application.

FIG. 8 shows a color or tint change between the time of application and sometime after the time of application of the coating on a substrate. This color or tint change may be useful to the user in that one can visibly see where on a workpiece the material has been applied and where it hasn't and may take certain steps responsive thereto. One may also judge the time that the coating has been on, qualitatively speaking, by the color change. The user may take certain steps, like respray (a second or subsequent coat), or affix a second surface to the workpiece responsive to the color change. In addition, the color change indicates where on the workpiece the coating has been applied. In one embodiment, as seen in FIG. 8, the sprayable sealant (here SF 2470) mixes and goes onamber, but almost immediately, within about 60-90 seconds, goes to a dark greenish or blue tint (buy typically clear) and, after about 90 seconds, begins to slowly go back to clear amber with the full color change in 3-5 hours.

Figure 10:
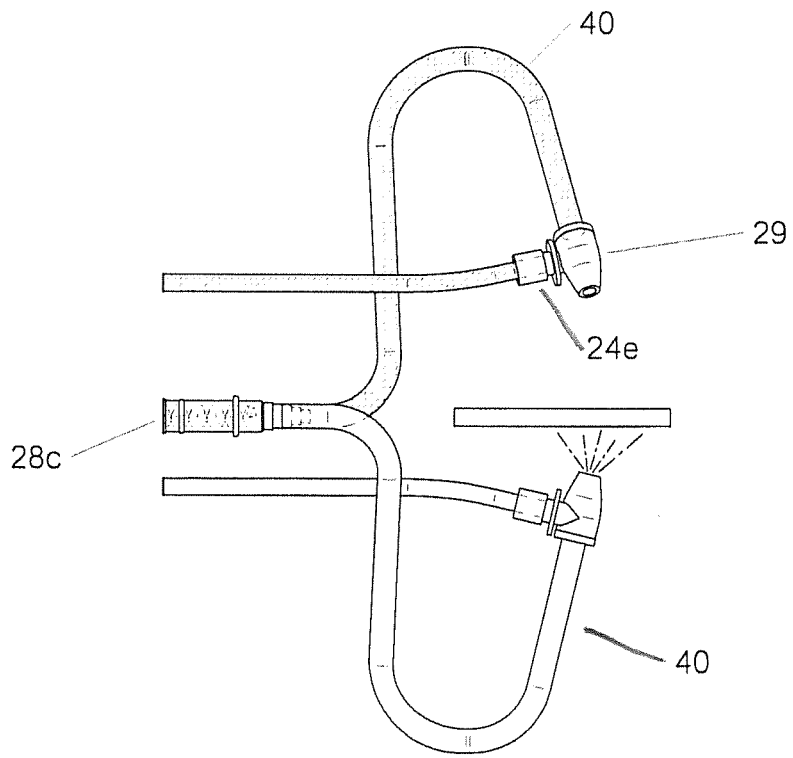
FIG. 10 illustrates a novel, flexible tip extension member for use with a pneumatic spray gun.
Figure 12A:
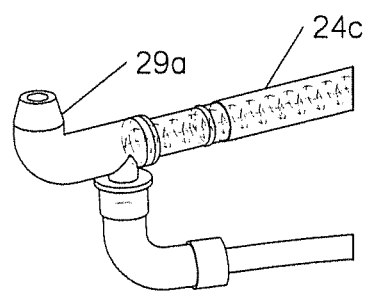
FIGS. 12 and 12A illustrate spray gun modifications that may be useful with applicant's spray sealant.

FIG. 10 shows modification to a spray gun made adding a flexible section 40 beyond the end of the mixing straw and before the application of the compressed air at compressed air inlet port 24e. This flexible section is flexible, but with sufficient rigidity that when set, allows one to control the direction of the emission of the spray from the tip (compare clear and speckled positions in FIG. 10). FIG. 12A illustrates a fixed 90° tip 29a, which in one embodiment may be a 90° and, in another embodiment, any angular deviation from a longitudinal axis of the gun and spray between about 10°-80°. Both FIGS. 10 and 12A embodiments make it easier to shoot around and underneath certain parts, for example, the deck plate and an aft galley.

One of the uses of the clear sealant coating includes a secondary fuel vapor barrier (see FIG. SE), such as around the outside of a front spar and wing center section fuel tank 51 (and associated spars, stringers, stiffeners, brackets and panels) on a Boeing 737 series aircraft. The secondary fuel vapor barrier may be used on aircraft internal fuel tanks. As such, the sealants may be applied to the exterior surfaces of a center wing box fuel tank. If a leak occurs in the fuel tank's primary seal system, the sealant may aid in containing the leak and preventing fuel spread. The sealants also help prevent fuel or fuel vapors from leaking into the cargo or passenger compartments and/or coming into contact with a possible ignition source. Moreover, their clarity provides for ease of inspecting the surface beneath the sealant for cracks, corrosion or the like.

Figure 11:
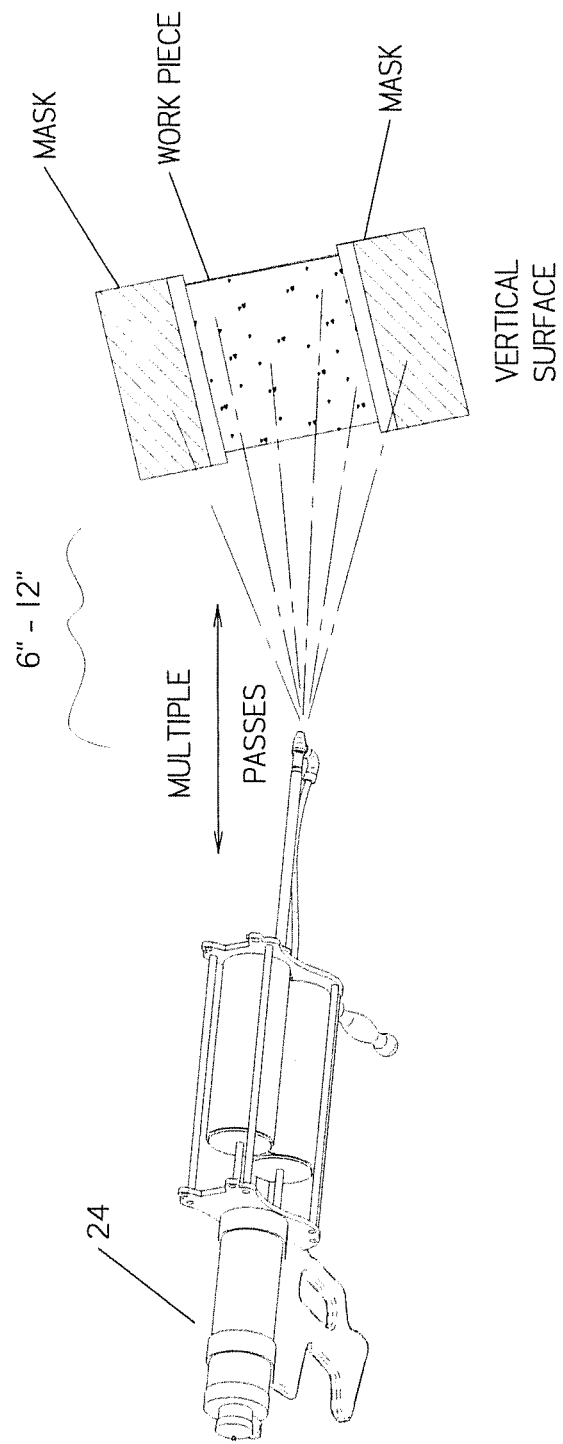
FIG. 11 illustrates details of spraying a vertical surface with a spray sealant applied with a pneumatic spray gun.
Figure 13:
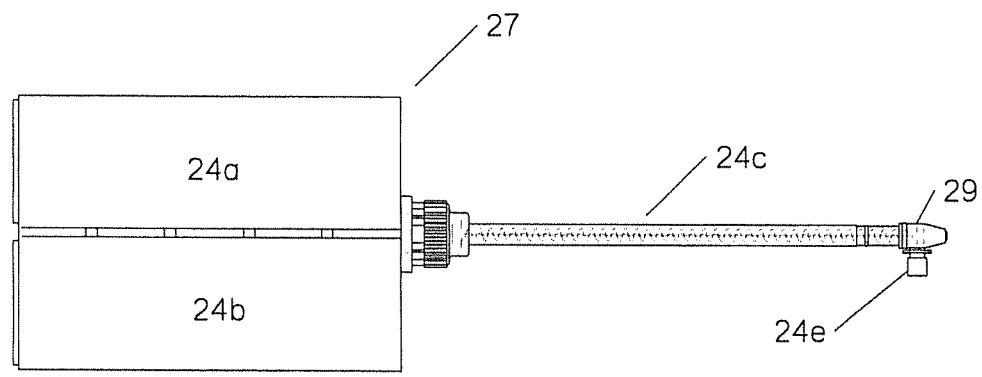
FIG. 13 illustrates a cartridge 27 for use with pneumatic spray gun.

FIG. 11 illustrates a manner dealing with potential overspray and misting issues when spray gun 24 is run at high pressures, such as spray settings between 5 to 10 (fluid flow) and 3-5 for air pressure on the Sulzer gun referenced herein, which may be a pneumatic Mixpac, MixCoat™. Increase fluid flow slightly for thicker coat on horizontal workpiece (increase splatter). Increasing air slightly will produce a thinner, misty effect and avoid sag on a vertical surface—but may require multiple passes to obtain the desire thickness needed for coating vertical surfaces. These air pressures for vertical surfaces are slightly higher than those typically needed for horizontal surface, where the pressure may be turned down to about 20 to 80. In a horizontal surface, the preferred embodiment of the uncured mix tends to be self-leveling and will generally level to the horizontal before a gel sets up.

Figure 12:
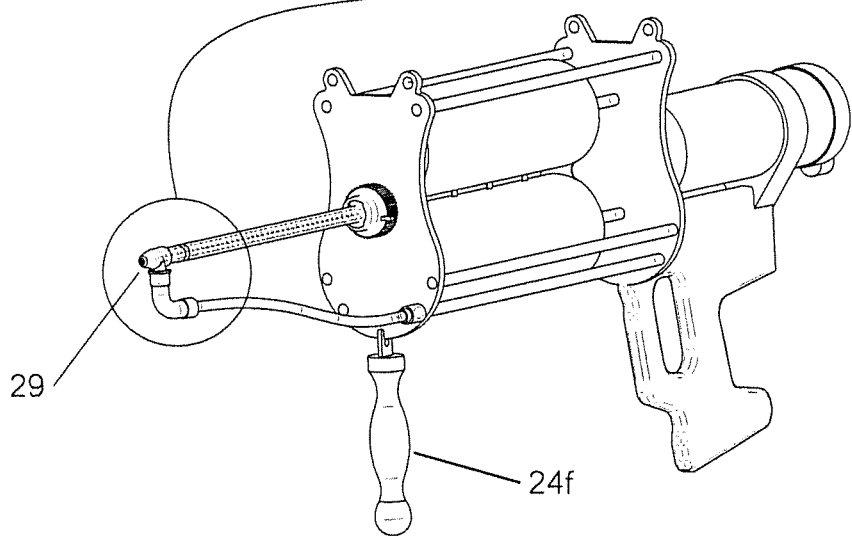

Applicant's mixing straw 24c, in one embodiment, is constructed as set forth in U.S. Pat. No. 7,144,170, incorporated herein by reference. The mixing straw may, in one embodiment, progressively divide and recombine through the use of multiple baffles 24c' (see FIG. 3) to thoroughly mix the reactive ingredients of the sealing coating. The reactive components traverse the length of the mixing straw and the number of mixing elements experienced by the fluid may be in the range of about 12 to 42. One mixing straw is available from Brandy Wine Mixers as Part No. MFH 08-32T and has specification chosen by Applicant to provide for the sufficient mixing at the desired viscosity ranges set forth herein. Mixing straws are also disclosed in U.S. Pat. Nos. 4,850,705; 4,767,026; and 4,538,920, incorporated herein by reference. The static mixing straws may be stepped down mixing straws and may be connected to cartridge 27 with any suitable connection, such as threads, Leur-lock, lock-on retainer nut, snap fit, frictional fit, and the like. Tip 29 may be straight, see FIG. 12, or bentto any angle, such as 90Q, see tip 29, FIG. 12A.

In one embodiment, the mixing straw has a spray nozzle attached to the end with an about 0.095 in. aperture. One static mixing straw that applicant has chosen specifically for the application set forth herein is Sulzer MixPack Static Mixer MFH 08-32T. The static mixer may apply the sealant in a 1:1 ratio and as 32 mixing elements, and the mixing straw may be removable and replaceable (disposable mixing straw).

Dispensing gun 24 is not particularly limited so long as it is capable of keeping the two part isolated until application and applying sufficient force to the two-part cartridge to move and mix the reactive components through the static mixing straw and expel the mix from the tip. Dispensing gun 24 may be manual, pneumatic or hydraulic and, in one type, is pneumatic.

The sealants disclosed herein are preferably supplied in a two-part cartridge ready for application immediately upon mixing, without any serious defects in the coating. Some prior art multi-part mixes require a period of time when they have to sit in the pot before suitable for applying to a substrate and if one waits too long, the mix becomes viscous and difficult to shoot or otherwise apply. Moreover, sealants herein have an overcoat window that allows large areas to be covered without the need for sanding before applying an overcoat. In a preferred embodiment, the overcoat window is as soon as 8 to 15 minutes from initial coat. In a preferred embodiment, the composition mixes clear, goes on clear, and stays clear through cure. Clarity, especially at full cure and over long periods of time (one year or more) is important for checking for stress cracks and corrosion. Moreover, if cracks or corrosion is found, applicant's sealant can be removed (by razor or abrasion, for example). The site may be repaired and the repaired area recoated with overlap, if necessary, onto the original coating. Good cohesion (with maintenance of peel strength) of the new just mixed to fully cured sealant insures that the overlap is strong and clean.

Spray settings on the Sulzer are about 5 to 10 for fluid flow and about 3 to 5 for air pressure. Increasing the fluid level slightly (to 5.5 for instance) will produce more of a splatter effect that works well for applying a thicker coating on horizontal surfaces. Increasing the air slightly will produce a thinner misty effect that allows you to apply an even coat on a vertical surface with no sag. The thinner the coat the better the clarity and the less sag in the material. Some parts may need several thin coats and others a fewer thick coats even if it may be a little less clear and sags a bit. Spray approximately 6 inches to 1 foot away from the work surface on most applications.

All of the embodiments illustrated for a sprayable apply equally to brush on or injectable as set forth in FIG. 1. In some embodiments, Applicant's sealant is VOC-free (SF2470 and SF2357). While the mixed ratio is 50/50, in some embodiments, the mix ratio may be 3:1 by volume and 100:31 by weight (Part A:Part B). In some embodiments, such as SF5387, the sealant has high tensile strength; in one embodiment, a tensile strength in the range of 3000 to 7000 psi at 250Q F.

Bubbles may sometimes form in the application of Applicant's sealant, but they may be reduced by spraying or applying a thinner coat or 2-5 or more thin coats, such as a coator coats in the range of about 1 to 5 mil, and allowing it to cure before adding the next coat. Coats in the range of 15 mil to 30 mil may also be applied.

Applicant's sealant may, in some embodiments, be used with a cartridge fittable in a pneumatic gun, which cartridge has two components. This is a consistent way for ensuring proper mixing. Hand mix, two single component cartridges or a SEMKIT style cartridge may be used (for use with a SEMCO® sealant gun).

FIG. 5B illustrates the clarity of Applicant's coating and the ability to see cracks or corrosion therethrough. Sprayable embodiments of Applicant's sealant coating 18, when applied as set forth herein, as one or multiple coats in the thickness ranges set forth herein, can cover a crack of at least about 30 mil. That is to say, if a small tiny hairline crack develops and expands over a period of about 1 minute or more up to open to about 30 mil, the sealant stretches without breaking and maintains its beneficial properties (including clarity).

Some applications in which Applicant's sealant may be used include: aft-galley deck, such as a Boeing 757; chemical toilets (including coating the wall and structure behind them): under-lavatories; lavatory pans; aircraft interiors including those for Med-Vac purposes; forward and aft entry doors; shear plates; and for replacing tape on the top of floorboards. In any area where chaffing may occur, Applicant's sealant may be applied as an anti-chaffing protectant. Because of the UV resistant nature (optionally with a UV inhibitor and stabilizer), exterior applications on the exterior of aircraft may be useful. This is especially true where rain and wind erosion may potentially be a problem. Any complex structural areas with irregular surfaces, especially unclamped areas, may be suitable for the application of Applicant's sealant coat. Applicant's sealant coat may be especially useful where the substrate is not compressed between faying surfaces. In some embodiments, such as SF2470 flammability testing has been passed (12 sec. vertical burn per Title 14CFR Part 25 Subpart D, § 25.853a, compartment interiors, Appendix F, Part 1(A)(1)(ii)). For repairs, for example, as set forth in FIG. 1A, a damaged portion around the repair area may be treated with a new sealant either injectable from a spray, a cartridge or brushed on using a solder flux or acid brush. The brush-on or pour applications may also be used for small areas that cannot be reached with a spray gun.

At room temperature, the tensile strength and the range for the materials are as follows: SF2470; about 145 psi (100-200 psi); SF5387; about 4766 psi (3000-7000 psi). At 200Q F (168 hrs.), SF5387 has a tensile strength of about 5169 psi (3000-7000 psi). At 250QF (24 hrs.), SF5387 has a tensile strength of about 6423 psi (3000-7000 psi) range. Peel strength (90Q peel back) in one embodiment against substrates coated with Boeing primer, SF5387 may provide a peel strength of greater than about 30 piw (at 90Q) or in a preferred range of 20 to 40 piw. In another embodiment, SF2470, the sealant tested on bare or abraded aluminum substrates having a peel strength of about 2.4 piw (at 90Q) or in a preferred range of 1 to 8 piw.

Figure 14:
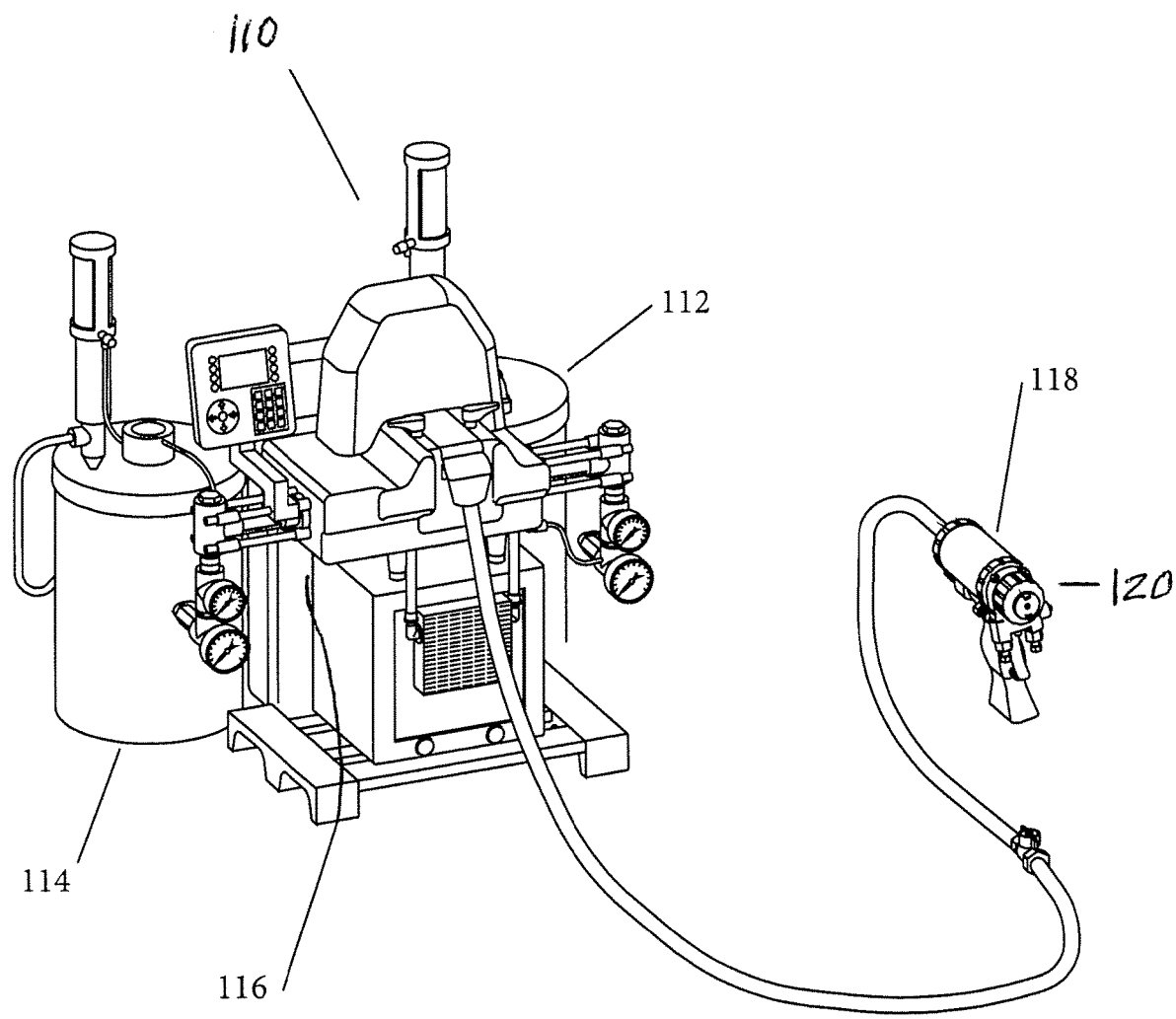
FIG. 14 illustrates a spray application system comprising a metered spray mix for delivery of two parts of a spray to a spray gun for impingement mixing and applying to an aircraft workpiece.
Figure 18A:
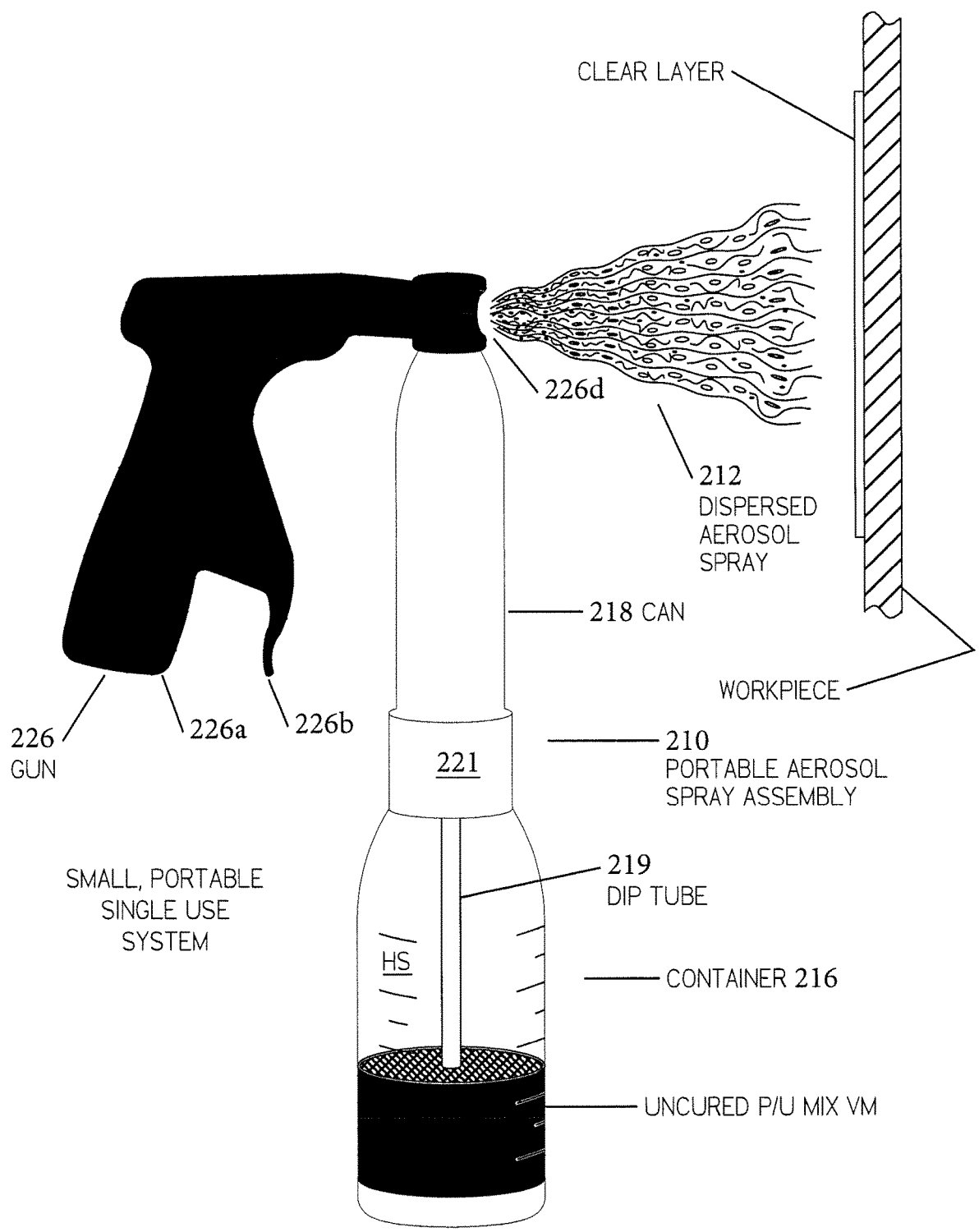
Figure 18B:
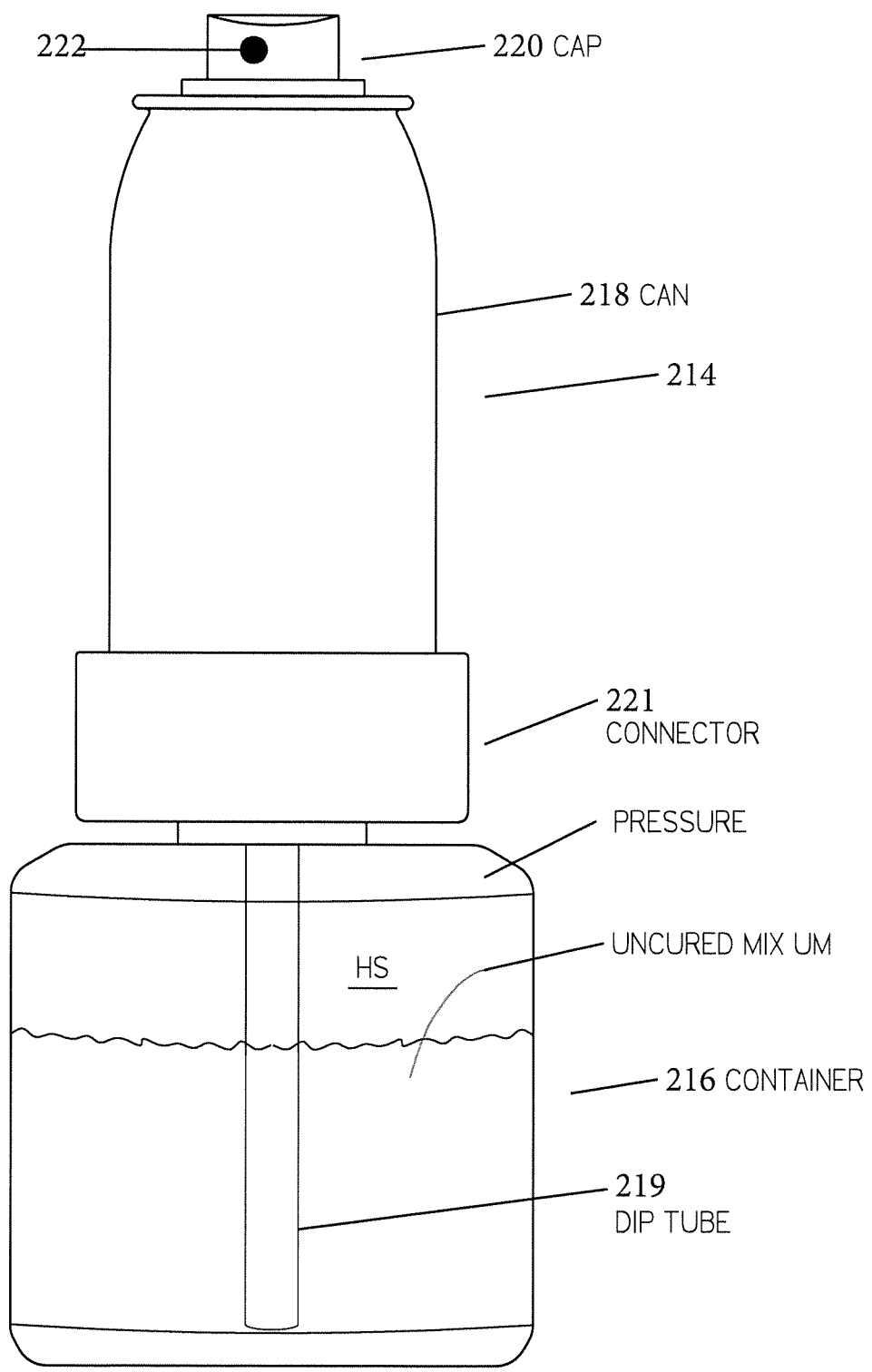
Figure 19:
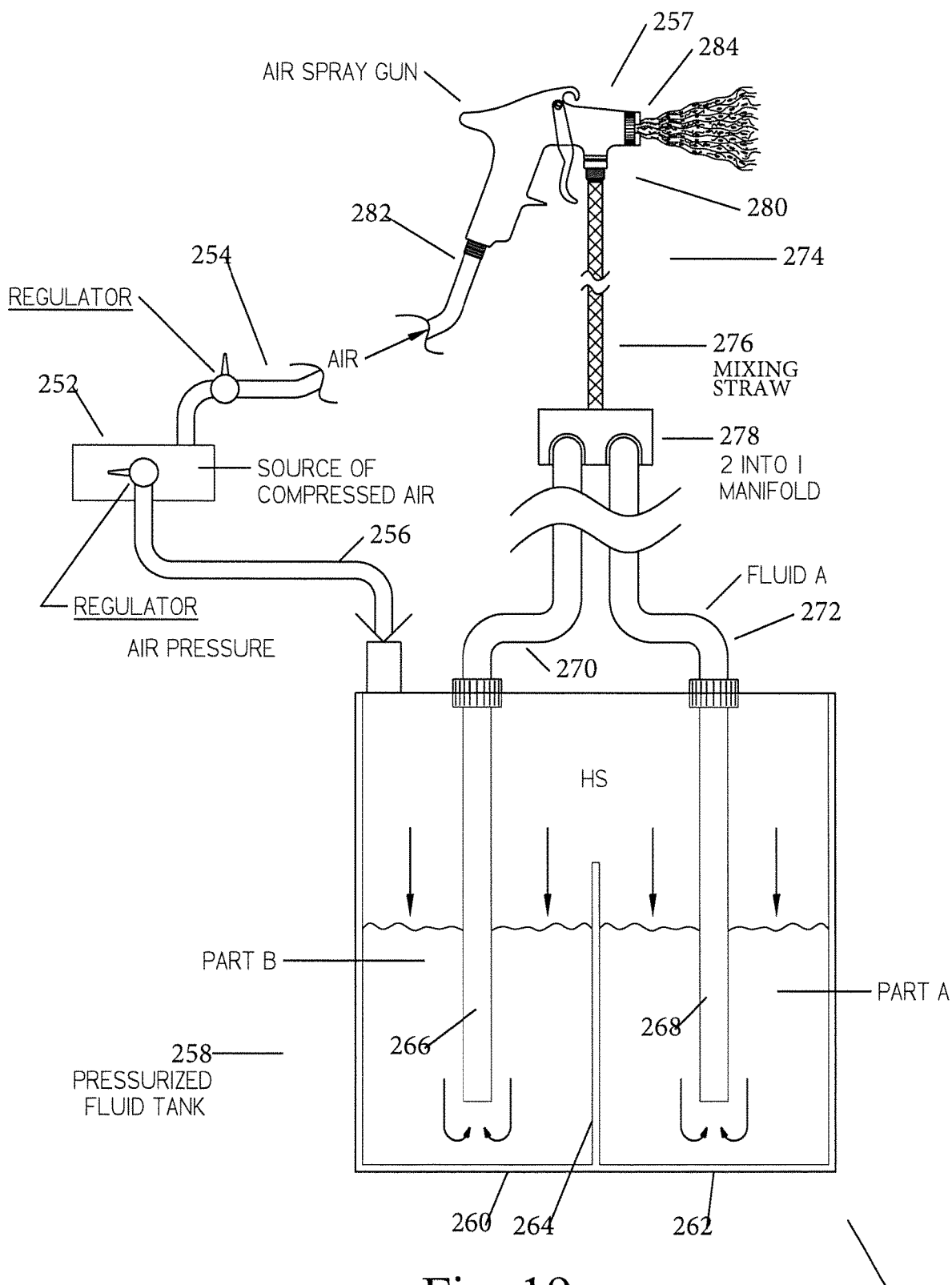
Figure 21A:
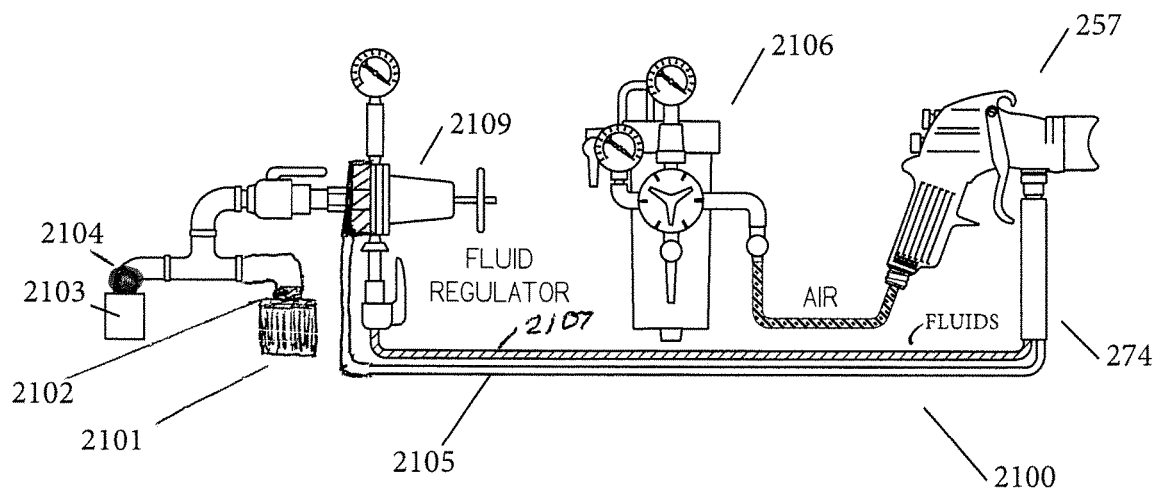
Figure 21B:
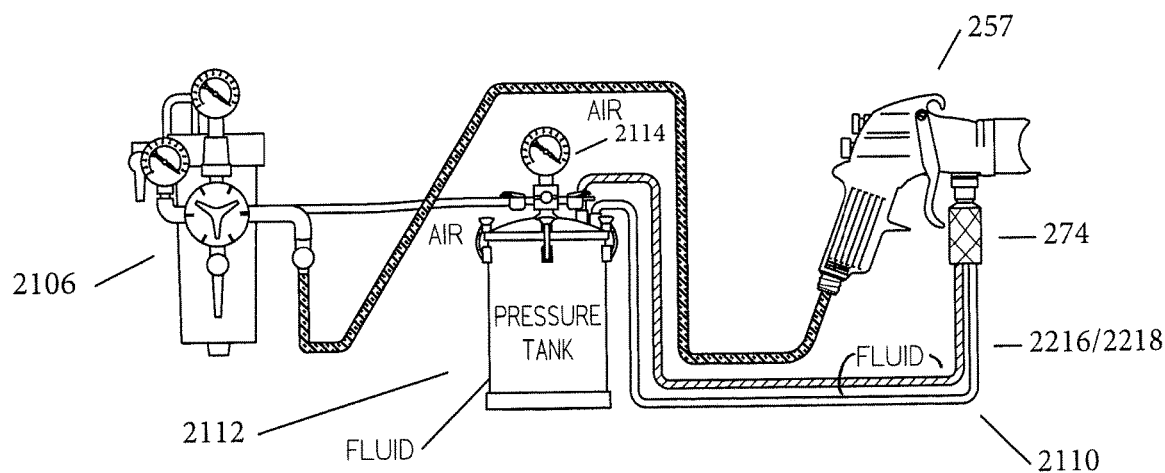
Figure 21C:
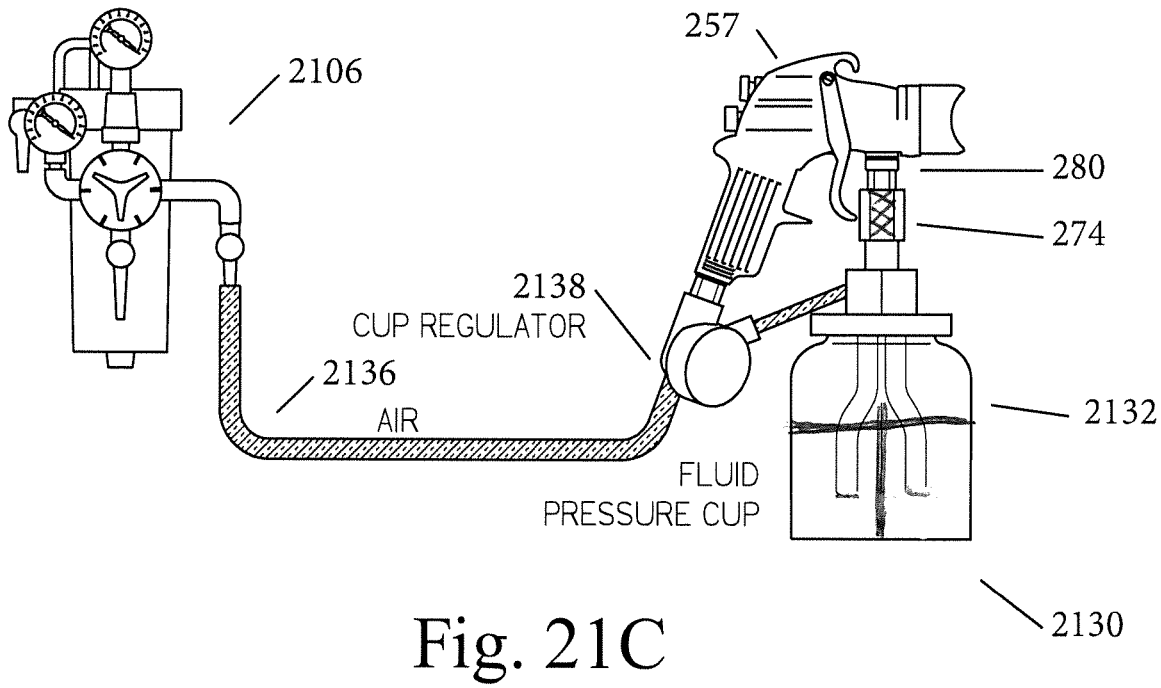
Figure 21D:
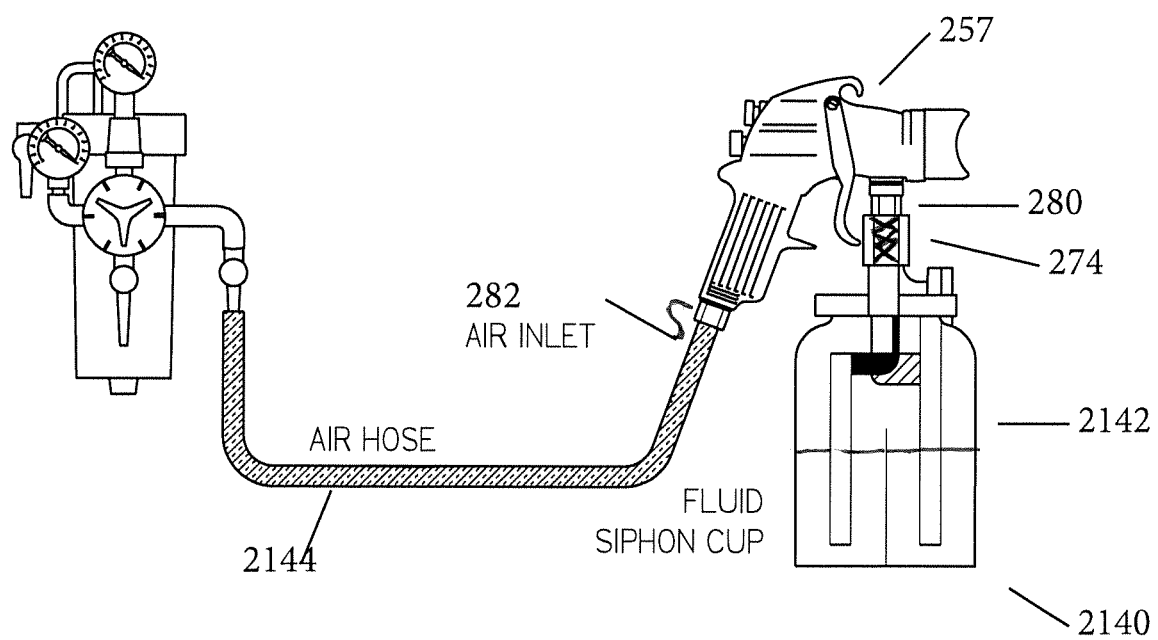
Figure 22A:
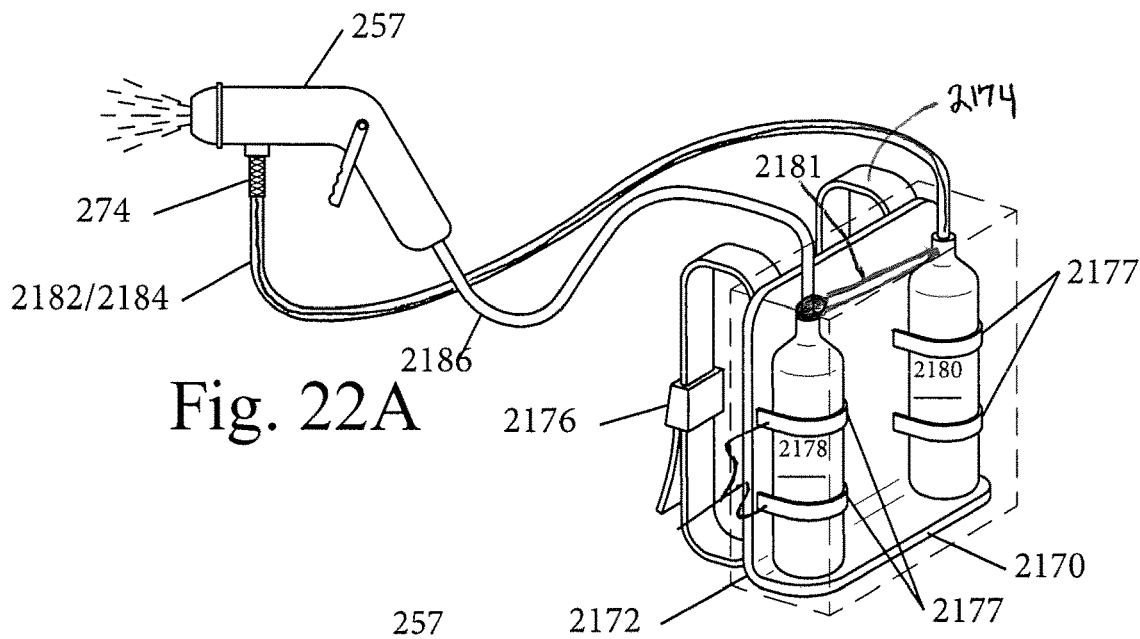
FIG. 22F illustrates a small, portable compressed gas cylinder that may be used with any of the embodiments set forth in these specifications.
Figure 22B:
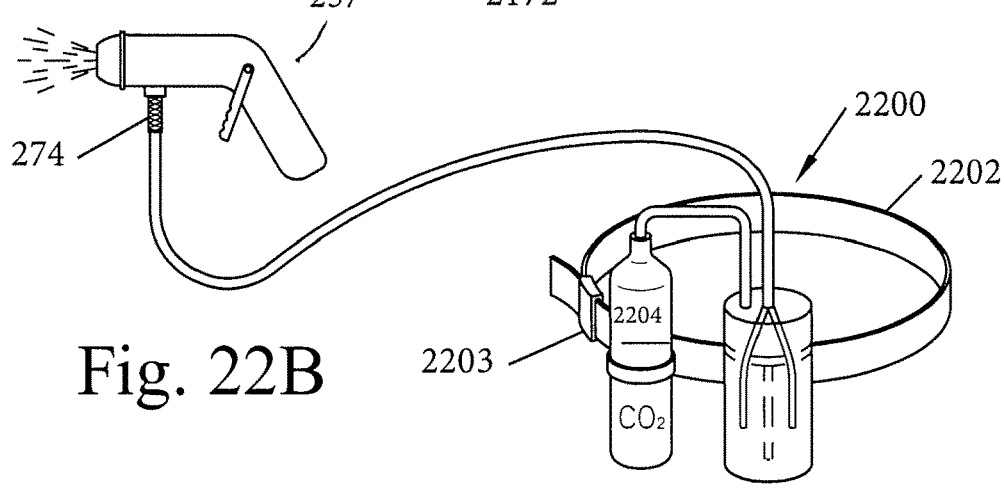
Figure 22C:
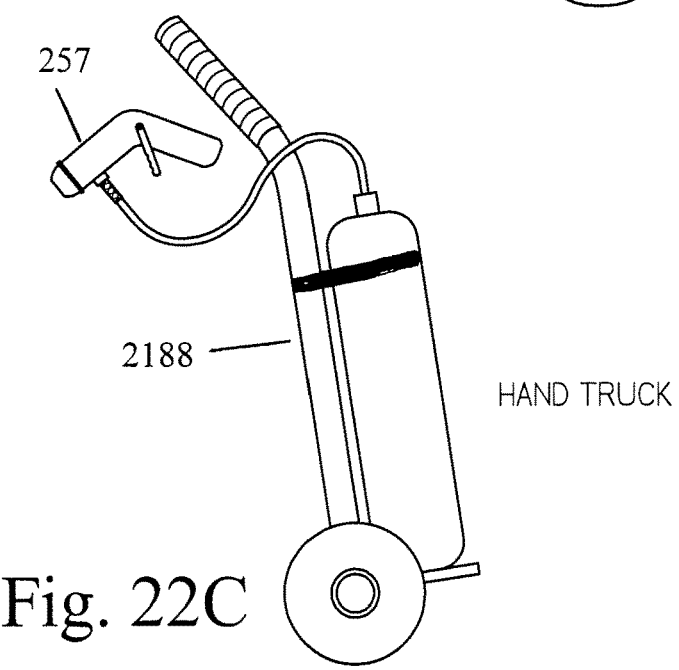
Figure 22D:
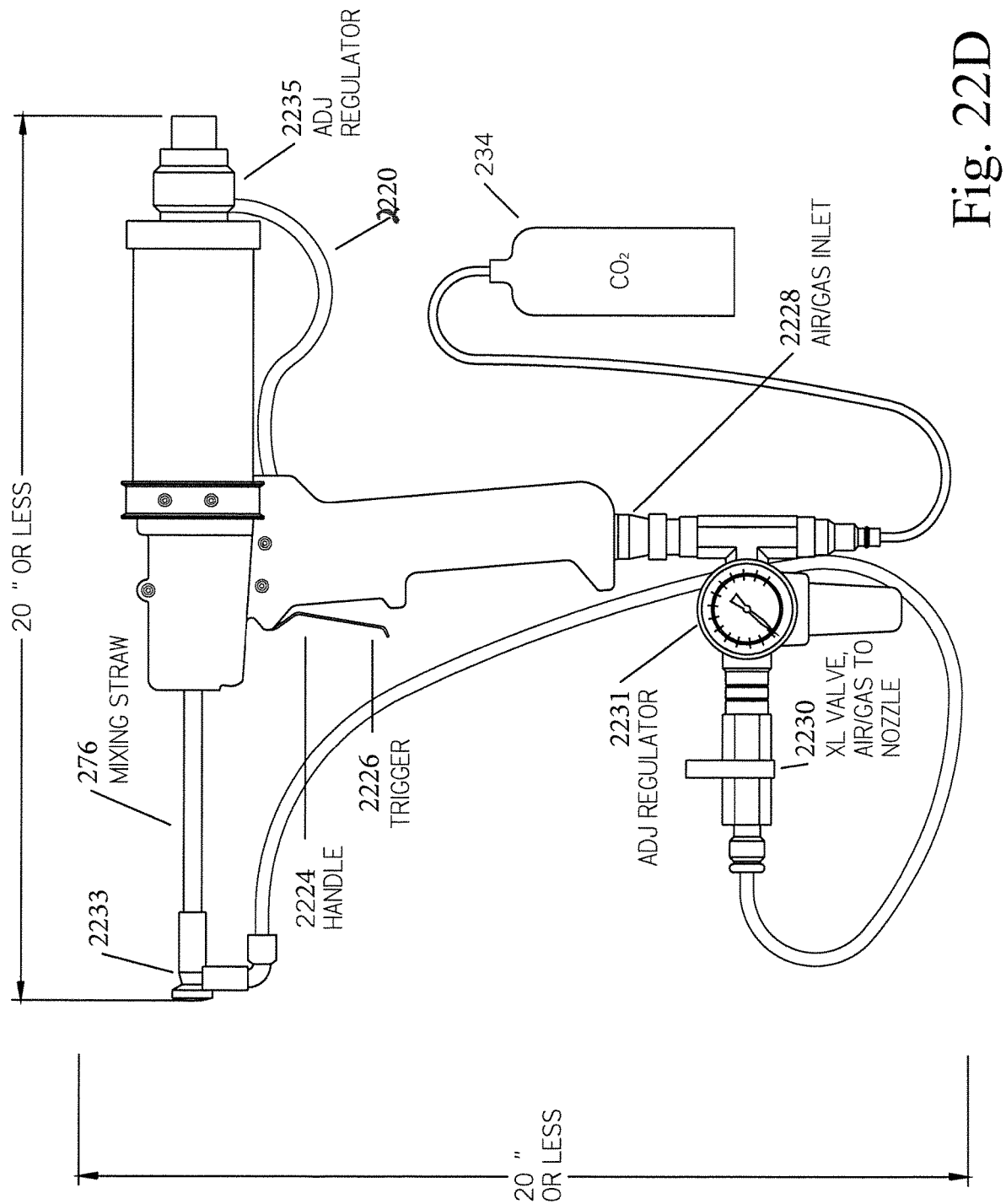
Figure 22E:
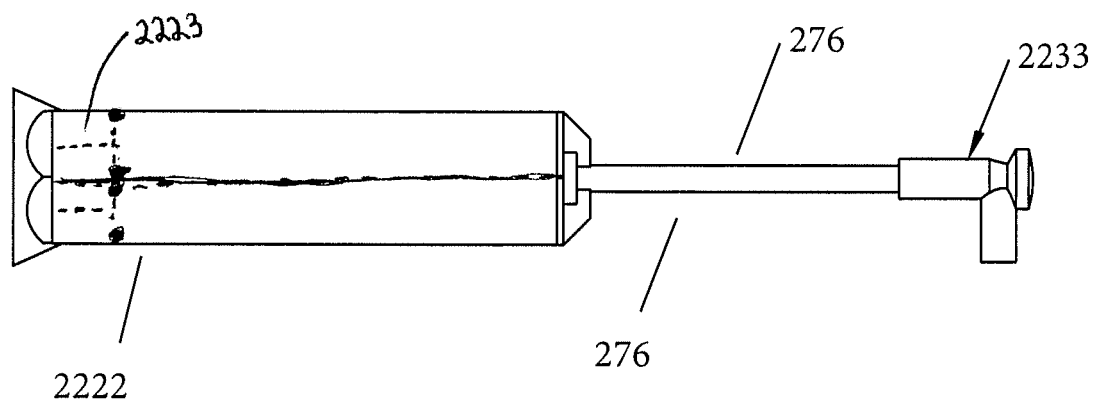
Figure 23:
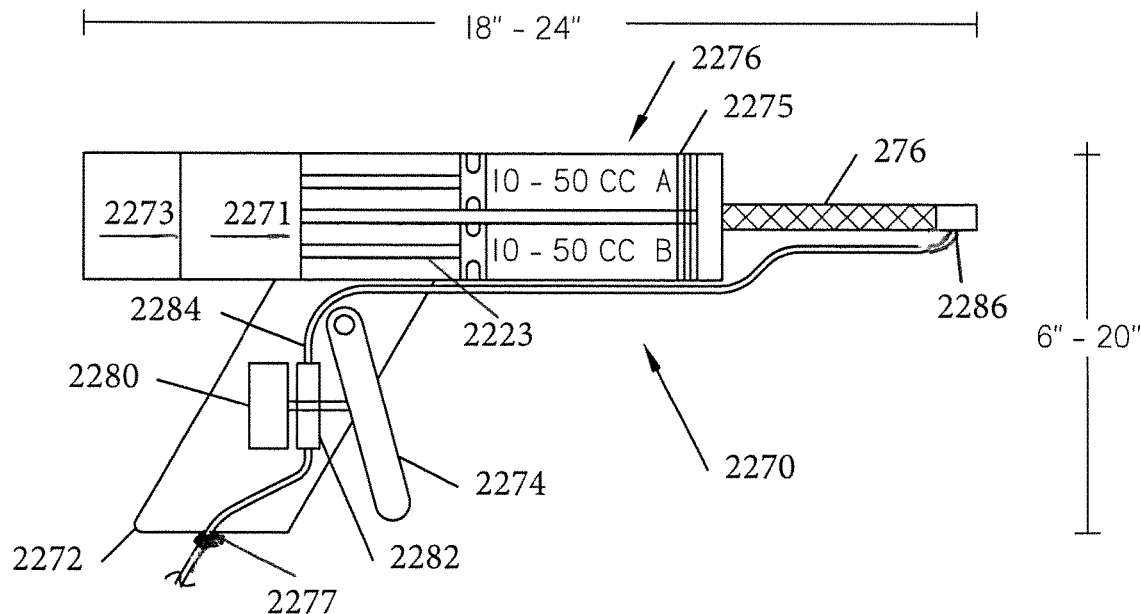
FIG. 23 shows another embodiment of a cartridge gun using an electric motor and drive system as well as an external source of compressed regulated gas and a trigger for simultaneously or sequentially energizing the motor and opening a compressed gas valve to atomize air at the tip of a mixing straw.
Figure 24:
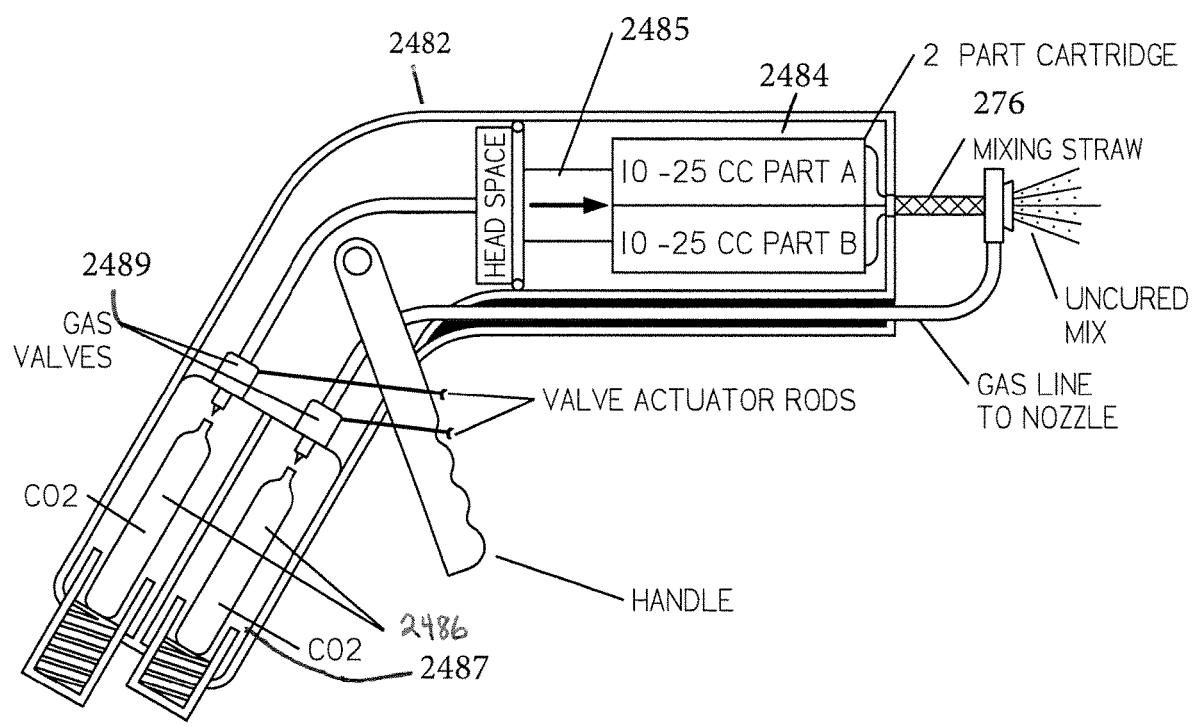
FIG. 24 illustrates a cartridge gun with an onboard compressed gas cylinder or cylinders for pneumatically driving a forcing element of a two-part cartridge, while simultaneously providing or sequentially providing air to a mixing tip.
Figure 25:
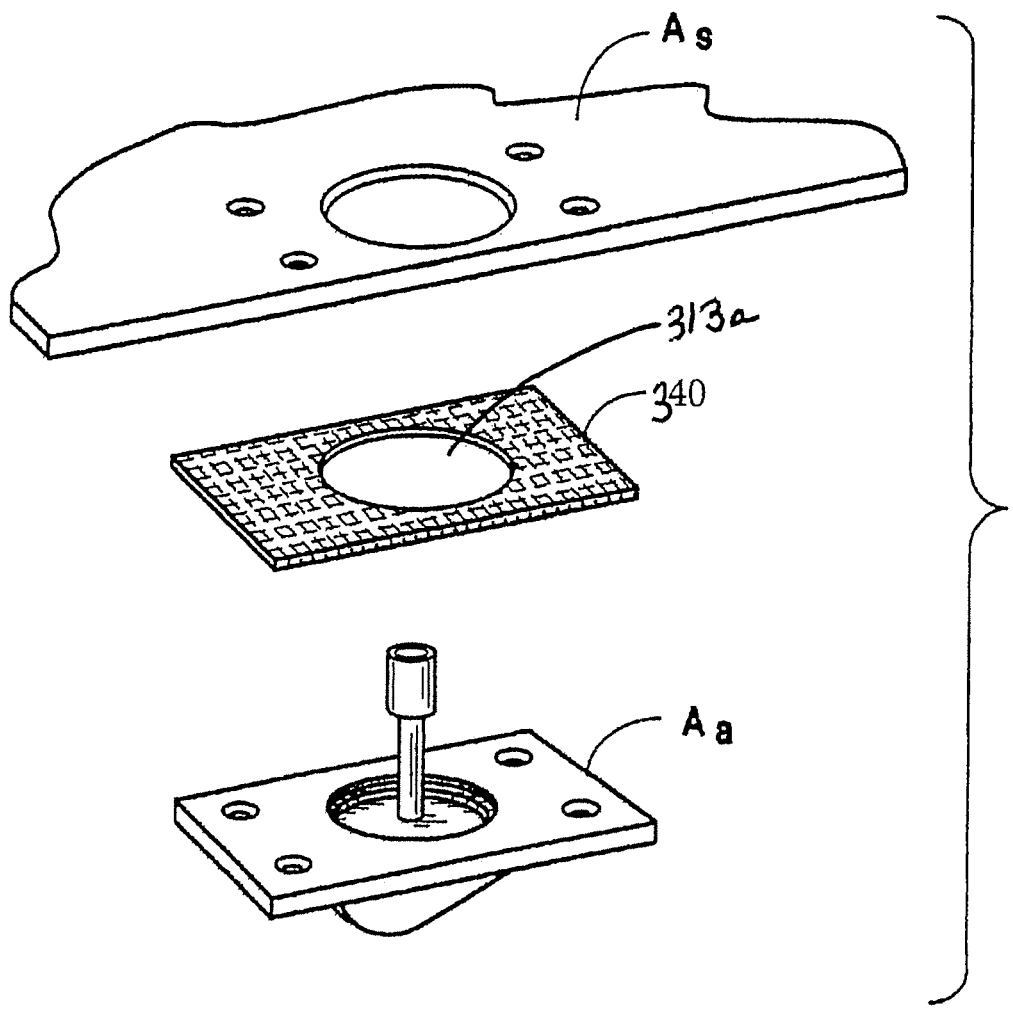
FIGS. 25, 25A, and 25B illustrate a method of using a preformed gasket with a liquid, curable two-component polyurea mix to provide an effective gasket seal between an aircraft skin and an aircraft antenna.
Figure 25A:
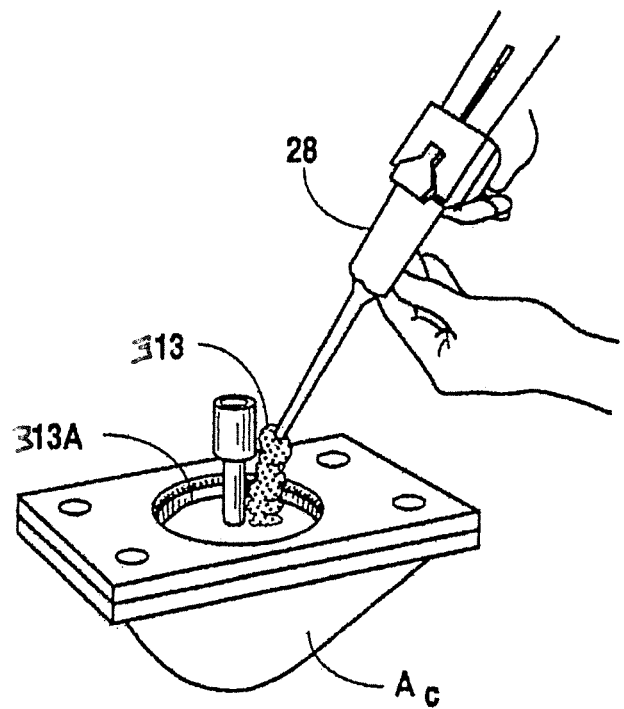
Figure 25B:
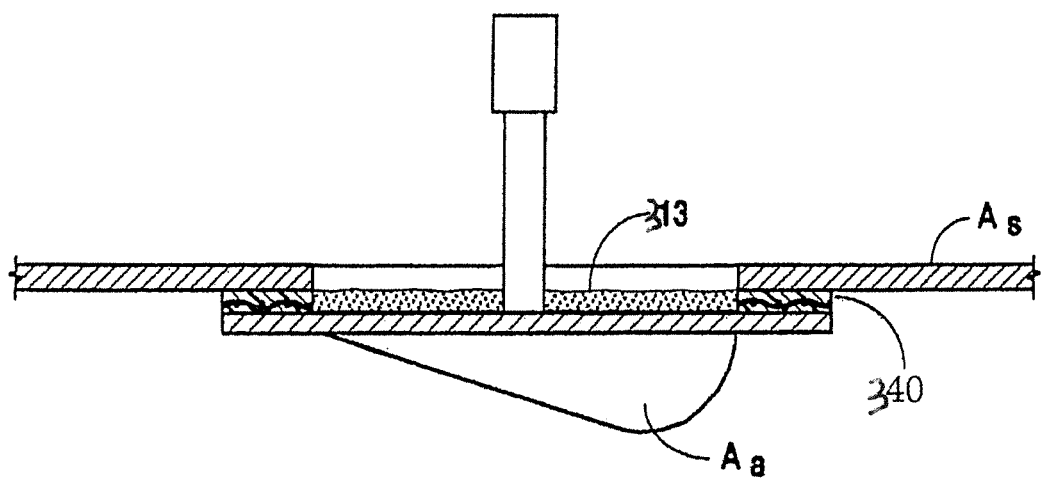

The spray guns disclosed and the spray systems disclosed may be viewed with respect to nozzle type (impingement, compressed air driving a pre-mixed-before the nozzle or driving a mix formed at the nozzle tip), air and fluid location (remote or on the gun). FIG. 6 shows a straw mix at the nozzle, with on board fluid and remote compressed gas source. FIG. 14 shows an impingement nozzle with remote air and fluid sources. FIGS. 18A and 19 show a mix before the nozzle and on board or on gun fluid and gas pressure sources. FIGS. 21A and 21B show mix before the nozzle, with remote air and fluid sources. FIGS. 21C and 21D show mix before the nozzle, with remote air and on gun fluid source. FIGS. 22A, 22B, and 22C illustrate mix before the nozzle with remote but body or truck carried air and fluid sources. FIGS. 22D and 22E shows straw mix at the nozzle and onboard compressed gas and fluid sources. FIG. 23 illustrates straw mixed at the nozzle, onboard fluid and electrical drive, and remote or onboard compressed gas. FIG. 24 illustrates straw mixed at the nozzle and onboard fluid and gas.

FIG. 14 illustrates a meter, mix and spray system 110 comprising containers 112/114 of Part A and Part B of a polyurea or polyurethane two-part mix that will go on clear, such as AvDEC SF 5387, Part A and Part B to cure clear in the thicknesses range indicated and to provide good adhesion to the underlying workpiece. In some embodiments, the workpiece may be the exterior of a Boeing center wing tank, approximately 4,300 gallon capacity, which is a primed coated aluminum alloy on which the system, and the product dispensed, in the thickness range and with the clarity indicated may be suitable for use. The fast, cure-to-clear product dispensed in such a way may be used as a secondary fuel barrier coating, should a leak occur in the fuel tank's primary seal system. This product goes on clear and cures fast (typically 30 mins. or less at 25Q C) to clear, making it easy for detection of cracks during inspection or as needed. In some embodiments, the product may be sprayed on top of a primer. It forms a resilient transparent coating upon application and to cure, with curing in a matter of minutes rather than days for other clear on/clear dry products.

FIGS. 14 and 15 illustrate Part A and Part B, pumped out of a two-part pump 116, through lines separately to a fusion gun 118 (FIG. 16) for impingement mixing, in nozzle 120 Note this system has two containers and pump separate from the gun by lines, or has a remote application on a workpiece may be as otherwise set forth in these specifications.

In some embodiments, Applicant has found that the combination of a clear or fast-drying to clear, two-part or two-component polyurea sealant material PSM, such as AvDEC SF 5387, and the use of existing or modified existing impingement spray technology may be effective for coating aircraft parts. Instead of a mixing straw, dispensing system 110 uses a hydraulic fixed ratio metering and delivery system, such as a Graco HFR (see FIG. 15). The HFR uses a dual acting positive displacement piston pump 116 for both high and low volume sides and, in the case of AvDEC SF 5387 polyurea two-component, is capable of mixing two components in an approximately 3 to 1 ratio for delivery to, in some embodiments, a fusion gun 118 for impingement mixing of two components that may cure on a substrate. That is to say, the pump 116 and fusion gun 118 is an alternate preferred embodiment to a static mixing straw for delivery of the clear, fast cure sealant as disclosed herein. This system can provide a constant flow rate to the two parts for a precise on ratio dispensing of the mixed product. This system may be compatible with a first part viscosity between 600 and 900 cps at 25Q C, and a second part viscosity between 90 and 130 cps at 25Q C, and a mix viscosity of less than 10,000 cps. In some embodiments, a dry-to-touch time (that is, tack free) may be between 10 and 25 minutes at 25Q C. A clear product results from the mix which then may show cracks or other defects in the underlying substrate, which may be one or more of the following aircraft parts: exterior parts, interior parts, and fuel tanks.

In some embodiments, the spray pattern may be flat or conical, with a spray droplet size that may vary. In some embodiments, a delivery of about 0.4 to 0.9 gallons per minute may be provided for coverage on an aluminum or aluminum alloy substrate (which may be primed) of between about 1 and 15 mil thickness resulting in sufficient clarity, including optical clarity, on the aircraft workpiece. In some embodiments, the Grayco HFR is combined with the fusion plural component, impingement mix air purge fusion gun 118. In some embodiments, the Part A material has an average viscosity of between 600 and 900 cps, and Part B has an average viscosity of between 80 and 140 cps at room temperature, tack-free time at about room temperature (72Q F) is about 15 minutes (mix ratio about 3 parts A to 1 part B).

FIGS. 17 (air purge) and 17A (fluid spraying) illustrate impingement ports IP in an air purge fusion gun 118 (FIG. 16), mixing Part A and Part B (triangles) in a nozzle 120, which mix may be purged (movable nozzle), such as by air (white dots) purging with air pressure, immediately after shooting so it does not cure in the nozzle. The mix combines by impingement, high velocity mixing in the nozzle and may be applied to a workpiece, such as a secondary fuel vapor barrier on a center wing tank, for example.

In some embodiments (see FIGS. 17 and 17A), an impingement mix gun has an impingement port IP size of between about 0.015 inches and 0.042 inches with an orifice size N of between 0.045 and 0.060 inches for delivery of the mix and in thicknesses set forth, and sufficient to provide optical clarity. Orifice size can be increased (thicker coverage) or decreased (thinner coverage).

FIG. 17 illustrates nozzle 120 into which impingement ports IP, one for Part A and one for Part B, open, emitting from the tip an uncured mix as an atomized spray. Uncured mix goes on clear, cures to clear, and stays clear, in most embodiments, on a workpiece that may be an exterior fuel tank. The exterior of a center fuel tank, for example. Going on clear and drying or curing to clear allows for immediate visual inspection to ensure complete coverage and to determine if there are any defects in either the application of the material or the underlying workpiece, in some embodiments.

In some embodiments, such as SF 5387, a two-part fast cure is a polyurea two-part with no solids. It may be applied by an air or airless spray. By an air spray, compressed air is used to help atomize the uncured mix and an airless, impingement system is used as set forth herein. Typically, Applicant's two-part polyurea does not need to be thinned before use as a sprayable in a spray gun or as otherwise sprayed as set forth herein. In some embodiments, there are no solids. In some embodiments, the peel strength is between 25 and 35 piw.

FIGS. 18A-24 illustrate additional embodiments of systems for applying a two-part, cure in place sealant coating to aircraft or other surfaces.

FIGS. 18A and 18B illustrate a portable aerosol spray assembly 210, whose function is to emit an aerosol spray 212, which comprises tiny droplets of uncured polymer mix, for application to a workpiece, such as an aircraft part (see FIG. 18A). Portable aerosol spray assembly 210 may comprise a spray can assembly 214, such as a Preval® sprayer (SKU #0223) that is typically less than 24 inches high, less than 8 to 12 inches long, and about 2 to 4 inches wide, the spray can assembly 214 for threaded engagement with a container 216 that has a threaded open top 216*a* (see FIG. 18D). Spray can assembly 214 includes an aerosol can 218 containing a propellant, such as isobutene, a cap 220 having a nozzle 222, and a dip tube 219. The spray can assembly 214 engages a gun 226. Note this assembly is a self-container system wherein it includes, in one portable assembly, all the parts of a system. Compare, for example, spray system 110 where the gun is remote from the containers.

Container 216 is filled, immediately prior to use, with a two-part curable mix (see FIG. 18D). This may be done from a handheld injection assembly 228 having two compartments 228*a* and 228*b*, in some embodiments, one of which contains polyol, and second contains a urethane. A mixing straw 230 may be used, which engages through a two into one couple, both compartments 228*a*/228*b* and has a mixing chamber 230*a* and a tip 230*b* for mixing the two prior to the uncured mix going into container 216 (see FIG. 18D). A forcing element 228*c* may be used to hand force with one hand the two viscous or at least partially viscous components of the mix in compartments 228*a*/228*b*, while the second hand holds the body of the injection assembly 228.

Threader connector 221 may threadably engage threaded top 216a with dip tube 219 terminating in the uncured mix. Spray can assembly 214 also includes threaded connector 221 for threaded engagement with threaded top 216a with dip tube 219 going into the uncured polyurethane mix with the removed end near the bottom of the container.

Figure 18C:
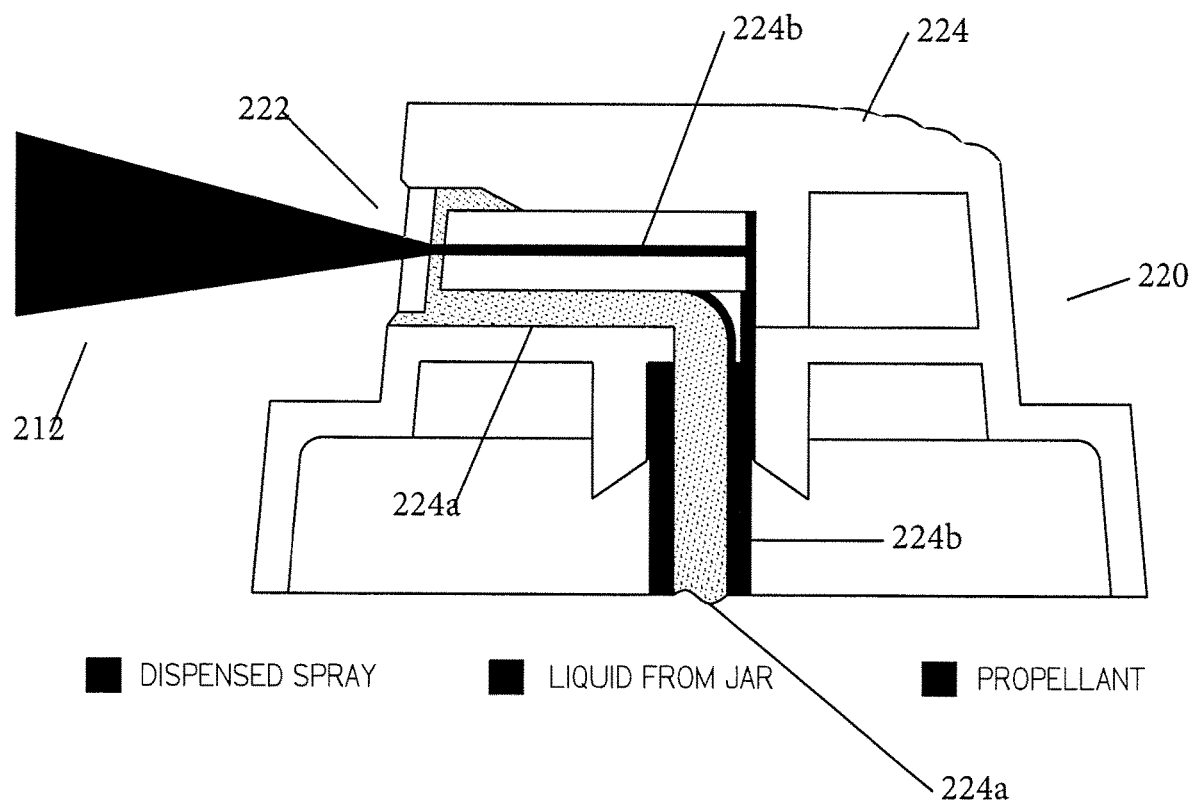
Figure 18D:
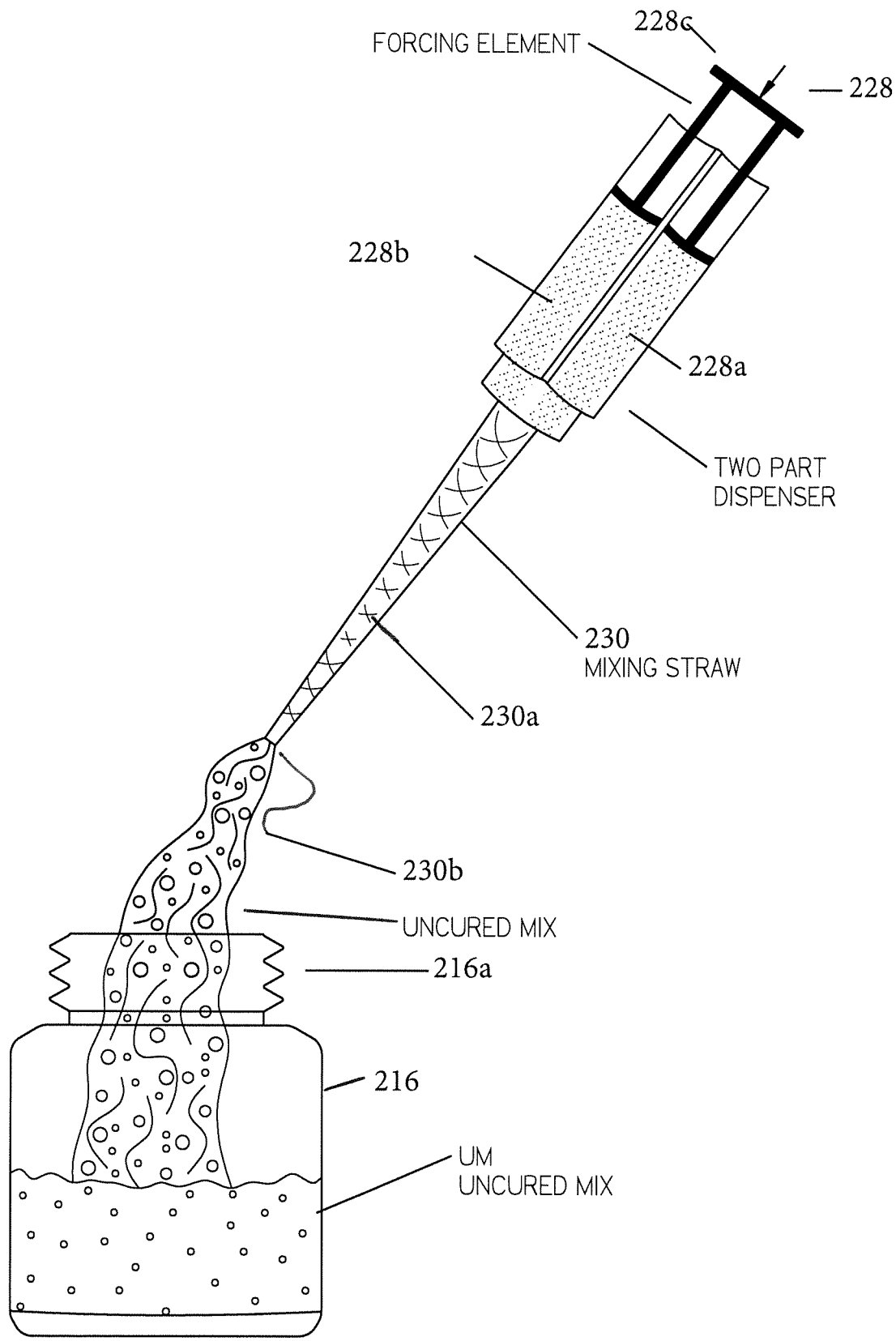

FIG. 18C illustrates cap 220, including nozzle 222, provided for engaging the top of the aerosol can 218 in a manner such that depressing a cap body 224 with respect to aerosol can 218 will emit dispensed aerosol spray of atomized uncured mix 212 from nozzle 222. Body 224 is provided with mix channels 224a and propellant channels 224b. In mix channels 224a, the uncured mix, under pressure is drawn up through dip tube 219, and forced out of nozzle 222, while propellant in the head space HS above the uncured mix "UM" will both force the uncured mix UM up the dip tube and out the nozzle, and will also atomize the mix into small droplets to provide a spray.

Gun 226 is also part of the Preval® spray and may be provided for engaging spray can assembly 214, which gun 226 may have a handle 226a for receiving a hand and a trigger 226b for depressing cap 220 while holding the can, typically by the top, in place.

Figure 19A:
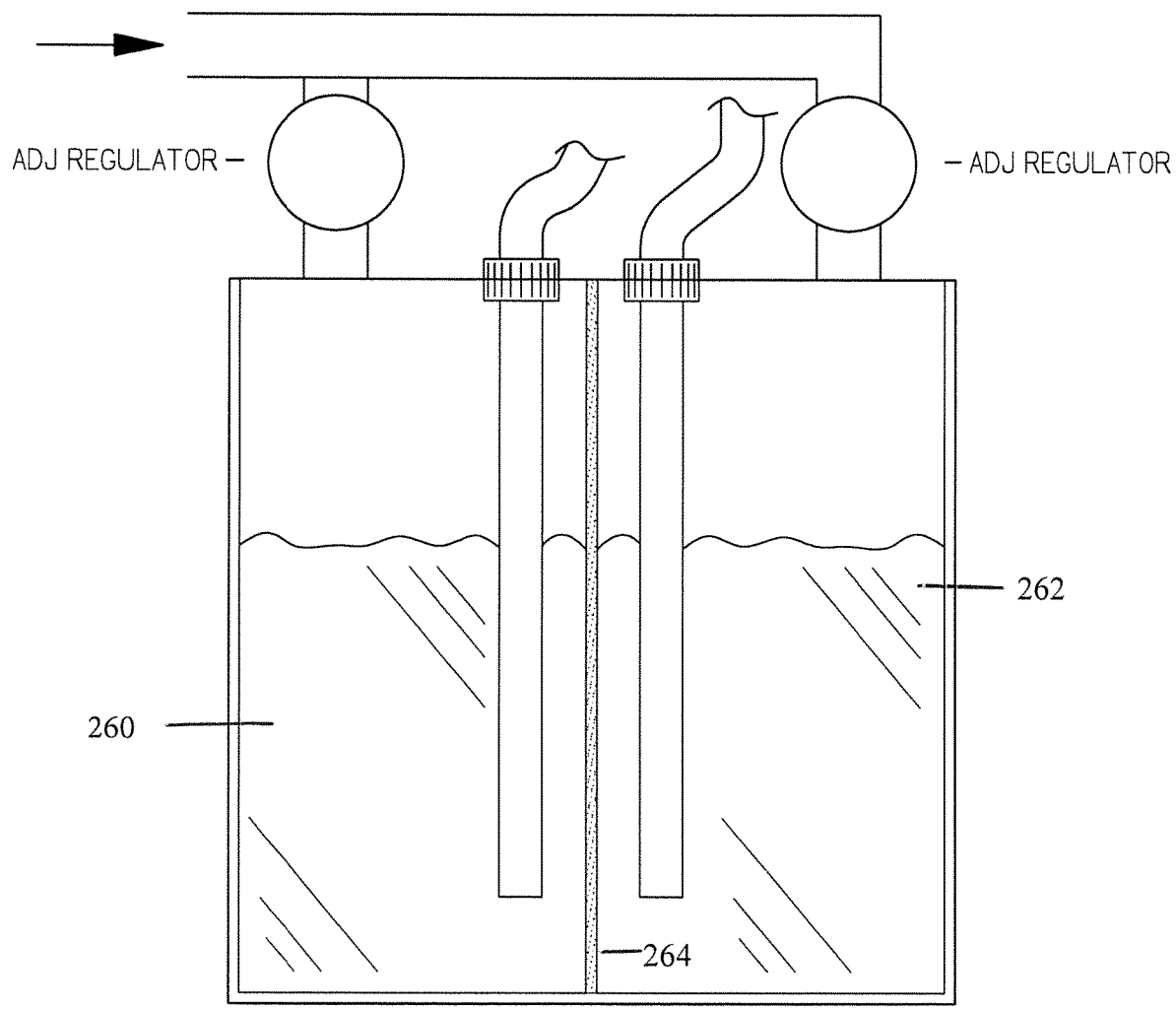

FIGS. 19 and 19A illustrates an assembly for providing mixing of the two separate fluid components prior to introduction into a spray gun for combining the mixed components and introducing a compressed gas from a remote source to form an atomized spray in the gun. The components of the uncured mix come from a remote pressurized two compartment fluid tank or container and a separate source of compressed gas drives the two components to a mixing straw and through the spray gun and the separate source of compressed gas may also provide regulated gas to the gun for atomizing the uncured mix at a nozzle of the gun.

FIG. 19 is an illustration of one embodiment of a compressed gas spray system 250 of Applicant's invention. The function of this system is to apply an atomized mix of uncured polymer to a workpiece, especially where the confines are tight, such as around or inside the fuselage of an aircraft. This may be achieved by using long lines between a source of compressed air 252, (such as a captive compressed air tank, a compressed CO2 cylinder, or an air pump), a pressurized fluid tank 258, and a spray gun 257. By having lines and spray gun 257 being small, typically about 24 inches or less (longest dimension) or, in some embodiments, 8 to 12 inches, in its longest dimension, one can move more easily in tight areas and apply an atomized spray of uncured two-part mix to the surface of an aircraft or other vehicle where upon it will cure in place on the workpiece.

FIG. 19, illustrates that compressed gas spray assembly 250 may use a source of compressed air with air lines 254/256 running to spray gun 257 and gas pressurized fluid tank 258, respectively. In some embodiments, these lines are 4 to 24 inches in length, for example, when used with belt or backpack systems (wearable systems) described below. In non-wearable systems, these lines may be 1 to 16 feet in length. Pressurized air tank 258 has two compartments 260/262 separated by a divider 264. Each compartment may hold one component of a two-component mix, in some cases a urethane and a polyol, that is emitted as an atomized spray from nozzle 284 of spray gun 257 in a mixed but uncured condition to cure upon a workpiece. Pressurized gas from compressed gas source 252 is provided to a headspace HS to force the two parts into dip tubes 266/268 and into fluid lines 270/272, which run between air pressurized fluid tank 258 and remote spray gun 257. Just before entering spray gun 257, the fluids may enter into a mixing assembly 274, which may include a mixing straw 276, where they will be mixed under pressure before entering fluid inlet 280 of spray gun 257 as a mixed, uncured viscous fluid. Entering air gun 257 at air inlet port 282 is compressed gas and the uncured, mixed fluid will mix with compressed air either internally or externally as set forth in more detail below.

FIG. 19A illustrates an embodiment of FIG. 19 wherein divider 264 may seal off the two compartments 260/262 with regulated air provided to each compartment thus providing independent flow control to each fluid part so as to control mix ratio. Note that any embodiment may use two separate containers for the two parts of the mix, rather than a single container with two compartments. When two separate containers are used, each would be separately pressurized (regulated or not regulated) with separate lines to the gun.

Figure 20:
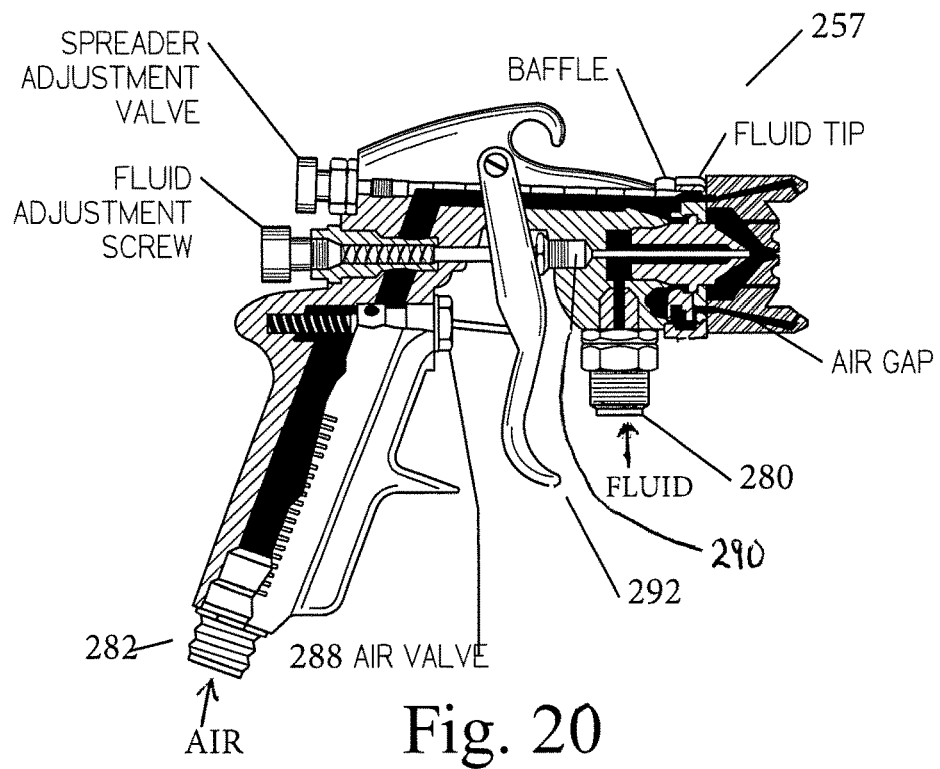
Figure 20A:
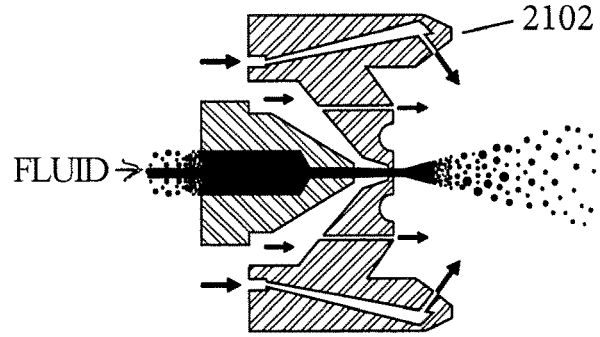
Figure 20B:
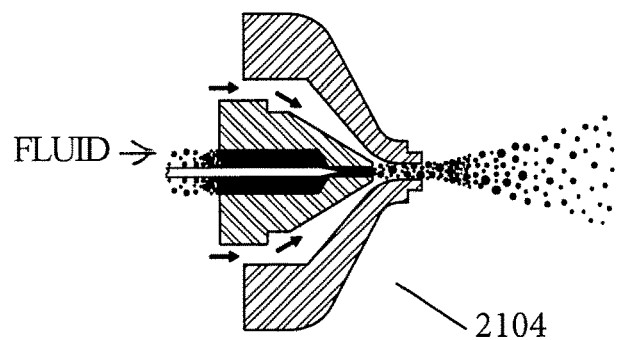

FIGS. 20, 20A, and 20B illustrate details of spray gun 257. Spray gun 257 may have fluid inlet 280 and a compressed gas inlet 282. Air valve 288 and a fluid needle 290 are simultaneously activated (or staged) by depressing trigger 292, allowing fluids to mix externally of nozzle (FIG. 20A) or internally of nozzle (FIG. 20B) with the air. An external air cap 2102 is illustrated in FIG. 20A, and allows for some control of the shape of the fan of the atomized spray pattern. Spray gun 257 (FIG. 20A) mixes the uncured mix and air outside the cap. FIG. 20B illustrates an internal mix cap 2104, where the spray gun mixes the high pressure air and the uncured mix inside the air cap before expelling them.

FIGS. 21A, 21B, 21C, 21D, and 21E illustrate a number of different spray systems that can be used to drive a fluid up to a spray gun for mixing just prior to entry into the spray gun, while also providing a compressed gas to the gun. Common to these FIG. 21 embodiments is a gun that receives compressed gas through a line from a remote compressed gas source and the gun also receives sometimes through lines attached to the mixing straw, sometimes from containers attached to the gun, the two fluid components that mix before entry into a body of the gun.

FIG. 21A illustrates a pressure feed system 2100 that includes a pair of fluid regulators 2102/2104, each connected to one of two tanks 2101/2103 of the two fluid components of the mix and provided in lines 2105/2107 to a mixing assembly 274 before entering spray gun 257. That is to say, in pressure feed system 2100, a fluid pressure regulator is provided along with a fluid pump 2109 (or pumps) (such as a diaphragm pump), instead of compressed gas, to each of the two tanks 2101/2103 to pump the two fluids of the two parts of the mix to the mixing assembly 274 (such as a mixing straw), with compressed air or gas being provided separately from a pressurized air source 2106 to the gun. Note compressed air and fluid pumps are separate and remote from the gun. Again, long lines may be used as needed.

FIG. 21B illustrates a pressure feed tank system 2110, similar to that found in FIG. 19, except with a two-compartment air pressure fluid tank 2112 containing at least one tank pressure regulator 2114. Here again, a pair of lines 2116/2118 is seen running from a pressurized fluid tank 2112 to mixing assembly 274 just before entering into air gun 257. A separate air line runs from compressed gas source 2106 to spray gun 257 and may provide regulated air pressure to the gun.

FIG. 21C illustrates a pressure feed cup system 2130 with a pressure fluid cup 2132 having a pair of dip tubes running into the two compartments for the two parts of the mix. A source of compressed gas 2106 carries compressed gas through a line 2136 to a cup regulator 2138, typically at the base of the handle of spray gun 257. Cup regulator 2138 will regulate both the amount of compressed gas going into the gun and the amount of gas pressurizing fluid pressure cup 2132, which may be attached, through mixing assembly 274 to fluid inlet 280 of spray gun 257.

FIG. 21D illustrates a siphon feed assembly 2140 with a fluid siphon cup 2142 having a pair of dip tubes running into the two parts and sucking up each for engagement with mixing assembly 274 (such as a mixing straw), which in turn engages a fluid inlet port 280 spray gun 257. Hose 2144 supplies pressurized gas to gas inlet 282 at gun 257 and that gas draws by the action of the siphon, the two fluids up from the siphon cup 2142 through mixing assembly 274 into the spray gun to be emitted in an atomized spray.

FIG. 22A illustrates a backpack portable system 2170, which may be used with any of the systems illustrated in these specifications or claims. In some embodiments, portable backpack system 2170 is designed to carry both a portable compressed gas source, such as captive tank 2178, a compressed gas cartridge (see FIG. 22C) or small battery powered compressor, and a two component fluid tank 2180 with two flexible lines 2182/2184 coming off of it to mixing assembly 274 before entry into gun 257 to help atomize the spray. A flexible compressed gas line 2186 is provided running from captive air tank 2178 to gun 257. Charging line 2181 will carry compressed gas to two component fluid tank 2180 to provide a pneumatic force to the two fluids. Frame 2172 may be provided for engaging a person's torso with straps 2174 and 2176, such as shoulder straps, and additional securement straps 2177 to hold the tanks to the frame.

FIG. 22B illustrates a belted portable system 2200 using a belt 2202 with a buckle 2203 for wearing adjustably about a user's waist. Attached to the belt may be any of the spray equipment or parts enclosed herewith, including those illustrated in FIGS. 22D and 22E. Attached to the belt may be fluid containers, included on the belt may be a compressed gas cylinder 2204, that is the source of a compressed gas to feed to spray gun 257 or a cartridge dispensing spray gun 2220 as seen in FIGS. 22D and 22E. In any of the embodiments in this application requiring the use of compressed gas, the source may be a small, lightweight captive gas container (see FIG. 22F) or a small compressed CO2 or similar containers for compressed gas. Indeed, a small electric (e.g., battery) powered compressor may be worn along with a battery (such as a rechargeable battery) for a source of compressed air.

FIG. 22C illustrates another "carriage means" to assist in portability—here, a hand truck 2188 that may engage the hand of a person and be wheeled along. The hand truck may contain one or more of a compressed gas container, fluid container, and/or spray gun on the frame (or any other elements or systems disclosed in this application) thereof. For example, a hook may be provided on the frame of the hand truck, as well as a baseplate to hold one or more containers or cylinders for use for the portable assembly.

FIGS. 22D and 22E illustrate a cartridge dispensing spray gun, which carries a two component removable cartridge assembly within the body of the gun with, in some embodiments, a portable (torso carryable), external source of compressed gas for introduction to the cartridge gun, to both provide drive (pneumatic) force to the forcing element of the gun and provide for atomization of the uncured mix as it emerges from the mixing straw. The gun may be small and portable.

FIGS. 22D and 22E are variations of a cartridge dispensing spray gun smaller than that available, that uses, in some embodiments, compressed gas to drive a small two-component cartridge 2222 that is seen in FIG. 22E, that is, gas pressure acting on the forcing elements or head space in a small cartridge, such as a 50 cc-100 cc (total volume) cartridge seen in FIG. 22E. In some embodiments, the cartridges are 10 cc to 25 cc in each compartment. The cartridge gun illustrated in FIG. 22D is between about 24-16 inches or less (in some embodiments, 20 to 18 inches or less) in longest dimension and is easily wearable on a belt or hooked onto a belt (see FIG. 22B) or the longest used in conjunction with a backpack (see FIG. 22A). The small, portable cartridge dispensing spray gun 2220 of FIG. 22O is seen to have a handle 2224 with a trigger 2226, compressed gas air inlet 2228 on the gun, and a mixing straw 276 having a mixing nozzle 2233. Unlike some other embodiments using compressed gas or compressed air, the gun in FIG. 22D, in some embodiments, uses the two fluids as part of a cartridge that goes on the gun body itself (not remote) with air or compressed CO2 or other gas moving through conduits in the gun to act on the forcing element 2223 and two separate fluids of the mix to force them through the mixing straw. In FIG. 22D, it is seen that there is a compressed gas control valve 2230 to control the flow of compressed gas to the tip or mixing nozzle 2233 of the mixing straw, which is at the removed end of the mixing straw. An adjustable or set pressure regulator 2231 may be provided to regulate the pressure at mixing nozzle 2233. In some embodiments, the compressed gas is being introduced through mixing nozzle 2233 after the two parts are thoroughly mixed in the mixing straw and emerge from the tip of the mixing straw. Again, noted is the small size of this arrangement, indeed the CO2 cylinders are typically less than 24 inches in length, the small size allowing portability and easy attachment to a belt, backpack or other portable carriage means. Adjustable or set pressure regulator 2235 may be provided to the drive gas—the gas that is driving the forcing element.

Figure 22F:
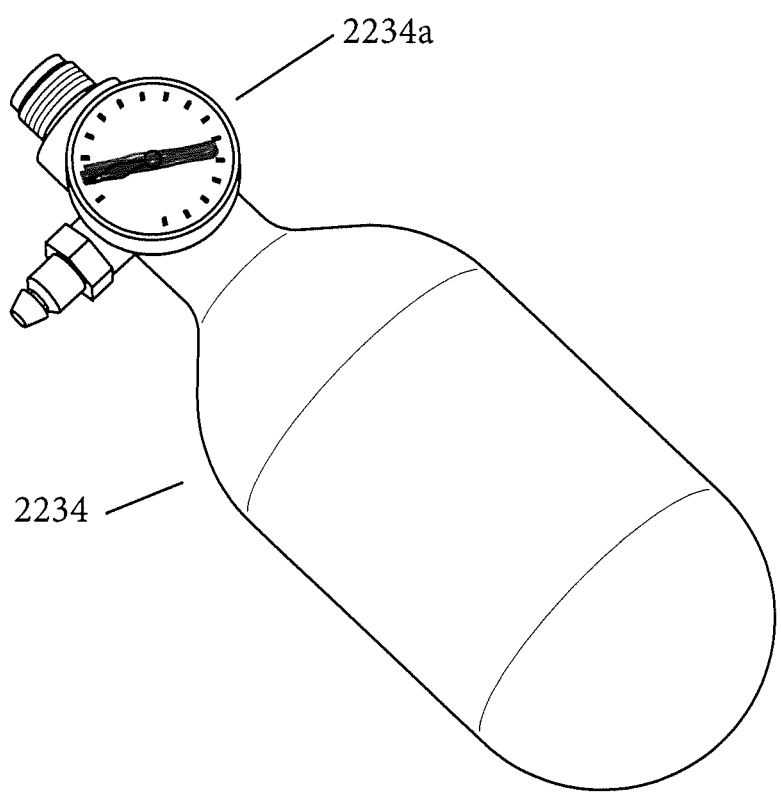

FIG. 22F shows a lightweight compressed air carbon fiber or aluminum bodied cylinder 2234 that may provide a regulated gas—see regulator 2234*a*, or unregulated compressed gas for any use described in these specifications. In some embodiments, the compressed gas source provides at least 2500 psi from a cylinder less than 30" (or 24") in length and weighing less than 24 lbs. fully charged.

It is understood that, when the viscosities of part A and part B are different and head space is used to move the fluids into the mixing straw and through the mixing straw, it may be necessary to adjust the size of the dip tube or otherwise provide either a restriction or an opening, such that a mix is delivered at a preselected flow despite the differences in viscosity between the two components. In some embodiments, the gas pressure may be adjusted by separate head spaces on each fluid.

FIG. 23 illustrates a combination electric/gas gun 2270 that uses an electric motor and drive system to drive pistons of a forcing element 2223 on a two-part cartridge 2275 and in some embodiments, simultaneously controls a compressed gas for supplying gas to mixing straw tip 2286 of the mixing straw to atomize a spray of mixed, uncured sealant. Electric motor drive system 2271 may be powered by a battery pack 2273 engaged adjacent, for example, behind, two-part cartridge 2275 that is part of a body 2276 of the electric/gas gun 2270. A handle 2272 may have a compressed gas inlet 2277 and a trigger 2274 that, when depressed, may simultaneously or in a sequential manner engage a motor switch 2280 and a gas valve 2282. Gas conduits or channels 2284 may be provided in the handle or other parts of the gun to provide compressed gas to mixing tip 2286 of mixing straw 276. Again, these may be small, typically less than about 18 to 24 inches in length, less than about 20 inches in height, and width (not shown) less than about 4 to 6 inches. As such, these guns can be easily handled with one or two hands, one hand on the handle and one on body 2276. A compressed gas source may be carried on a backpack, belt or other carriage device. Note that mixing tip 2286 may be omitted, the gas supply elements omitted, and this embodiment becomes an electric powered gun that emits a flow of mixed fluid from the straw—not any atomized spray.

Figure 23A:
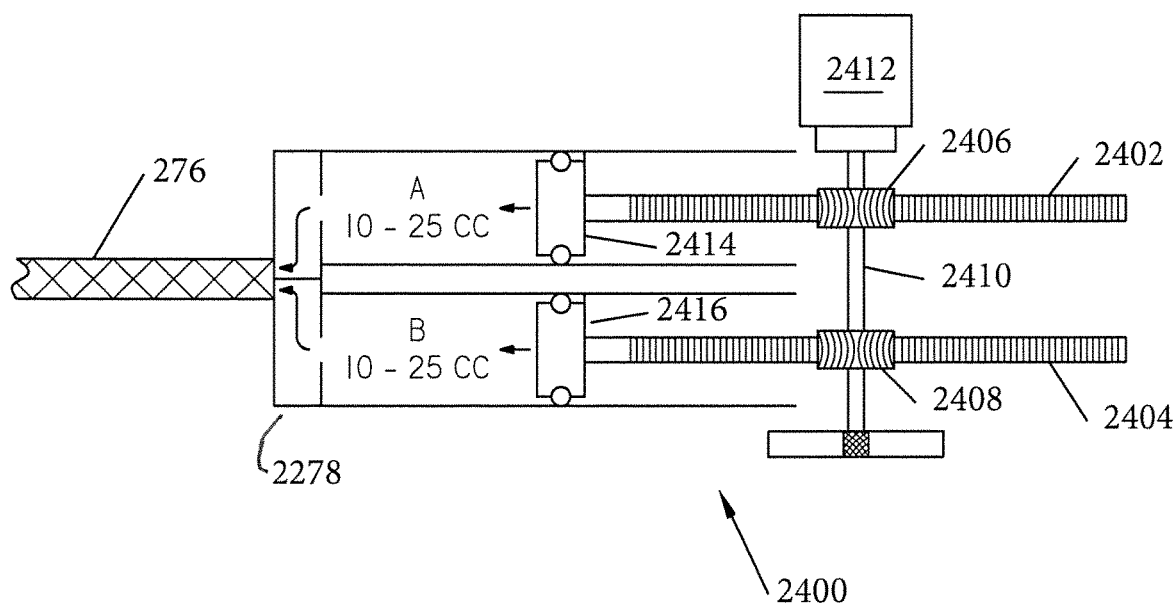
FIGS. 23A, 23B, and 23C illustrate a variety of electric drive systems for driving pistons of a two-part cartridge for use in the cartridge gun illustrated in FIG. 23.
Figure 23B:
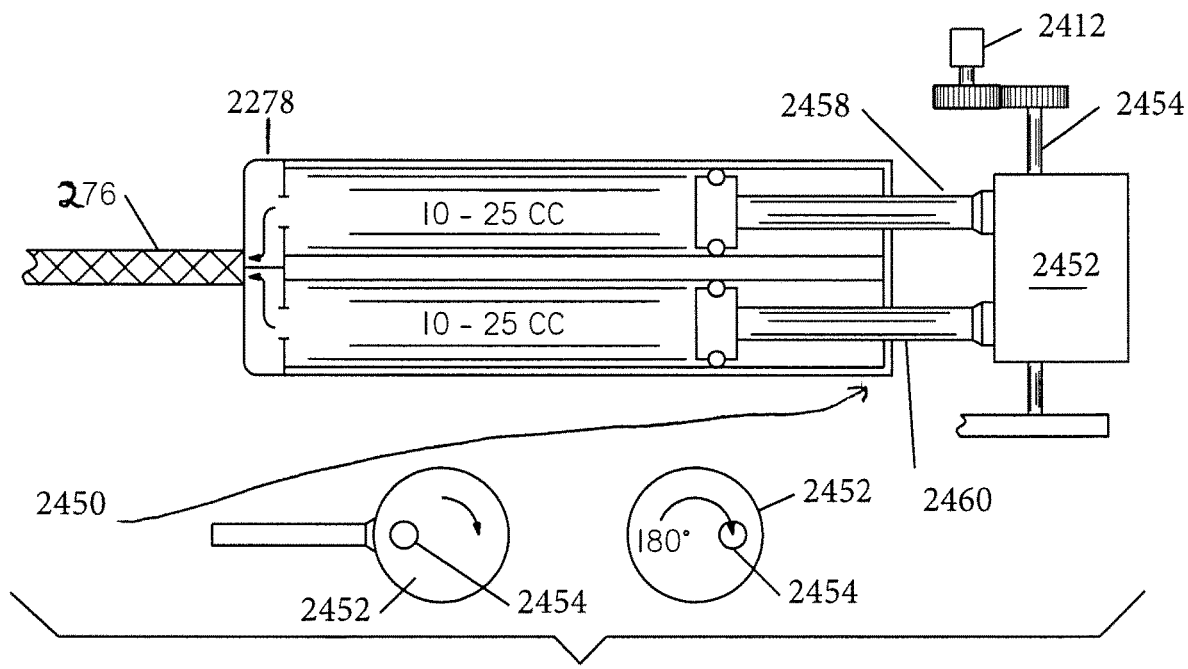
Figure 23C:
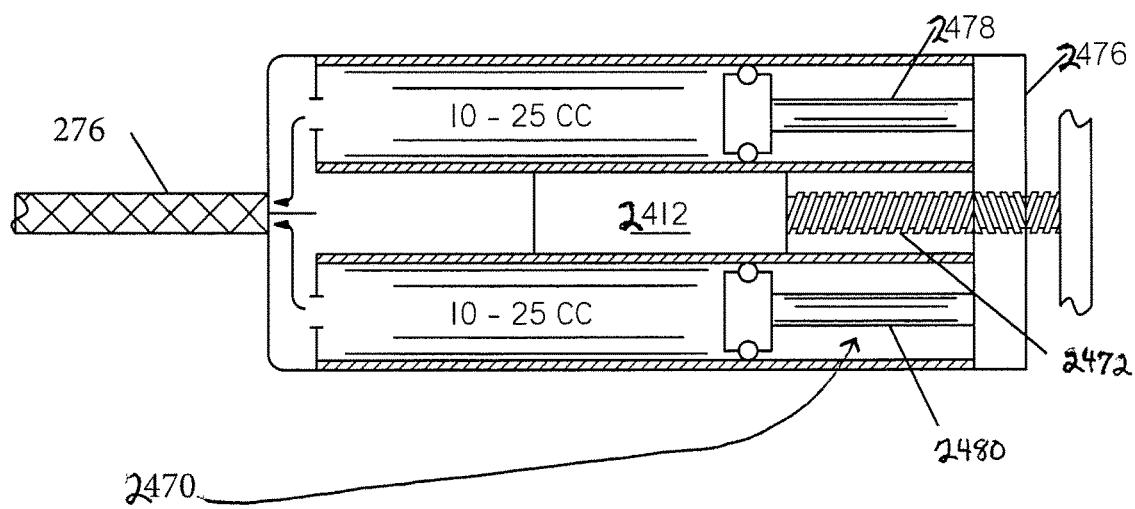

FIGS. 23A, 23B, and 23C illustrate three different drive systems, wherein an electric motor when energized drives two piston rods and two pistons, each piston in a separate chamber, at a common rate, so that i.s.e. the same amount of fluid of part A and part B are mixing in the mixing straw 276—at a 50/50 ratio. Moreover, when one of the two parts is more viscous than the other, each of these systems still provides for a common rate of injection of a fluid and, therefore, a 50/50 mix ratio to the mixing straw 276.

FIG. 23A illustrates a two-rack, two-pinion drive cartridge system 2400, where a first rack 2402 and a second rack 2404 is driven by a drive or pinion gear 2406/2408, each of the drive or pinion gears 2406/2408 coming off a drive axle 2410 driven by an electric motor 2412. Racks 2402/2404 may be the piston rods and have pistons 2414/2416 at the ends thereof to drive each of the separate fluids into the two-to-one manifold 2278 for mixing in mixing straw 276. Note that gears 2406/2408 may have the same diameter for 50/50 feed rates or different diameters to vary the feed rate.

FIG. 23B illustrates a cam driven system 2450 that uses electric motor 2412 to drive, directly or typically through a drive gear and driven gear, a cam 2452 mounted rigidly on a cam drive member 2454, piston rods 2458/2460 operate to ride on the surface of the cam and, the cam being a cam lobe with a non-round rotational movement, may simultaneously drive the two pistons the same distance at the same rate and, therefore, feed the same amount of fluid from each of the two chambers into the two-into-one manifold 2278 and into the mixing straw 276. Note that cam 2452 may be two separate cams with different cam profiles to drive fluids at different feed rates.

FIG. 23C illustrates a central screw drive system 2470, wherein electric motor 2412 drives a screw drive 2472 in a rotational manner. Screw drive 2472 has a screw engagement with a common tie-in plate 2476, which connects to two separate piston rods 2478/2480 to drive the two pistons at the same rate, even when one part of the two parts is more viscous and, therefore, provides more resistant to flow than the other part. These electric drive systems are designed in part to compensate for differences in viscosity of the two parts yet, having different viscosities, they still can be provided in the same ratio (same flowrate) to the mixing straw. It is noted that this embodiment will work without the spray tip (no compressed air) simply fluid mix flow from the tip.

FIG. 24 discloses a novel, portable spray gun 2482 similar to FIG. 22D that combines a two-part cartridge 2484 with a mixing straw 276 for atomizing a mix spray and a mix fluid at the end of a tip of a mixing stray. One or more gun compressed gas cylinders may be trigger operated to provide compressed gas to pneumatically drive a forcing element 2485 of the cartridge and provide compressed gas from the same or a separate cylinder (two compressed gas cylinders shown) to a tip for atomizing a mixed spray. In this embodiment, it is noted there are no external elements—the gun contains the compressed gas source in handle compartment 2487 as well as the two fluids, here shown by a cartridge of the forcing element. The "onboard" compressed gas provides energy for the forcing element of the cartridge and onboard compressed gas provides for atomization at the tip. A trigger may have actuating rods which engage a valve or valves 2489 at one or more compressed air containers 2486 for adjustably controlling compressed gas to the forcing element and compressed gas to the mixing tip.

Any of the systems disclosed herein may include regulated compressed gas to the nozzle for mixing, which may include an external regulator on the compressed gas before it gets to the gun or the gun may have a built-in regulator that regulates the compressed gas before it gets to the nozzle. Triggers may simultaneously allow the flow of compressed gas and fluid or may be staged to allow one to flow before the other. Note that the sprayable systems disclosed herein, including FIGS. 6 and 7, which provide compressed gas at the mixing tip, will operate as flowable (not sprayable) systems for applying the two part polymer mix. Also, while sources of compressed gas are shown such as captive tanks and compressors, hand pumps may be used to pressurize a fluid container with the mix or two components separately, to move the fluid(s) to a mixing straw for flowable applications. For example, in FIG. 19, the gun may be omitted, and a hand pump use to pressurize tank 258.

FIGS. 25, 25A, 25B, and 25C illustrate the use of pliable polyurea (or other polymer) two-part flowable sealant mix 313 as an injectable sealant (no skeleton, cures in place on the aircraft assembly), typically a polyurea resin and a diisocyanate, more typically a polyurea curable mix. Mix 313 will cure in place, and may fill any central cutout areas 313a in a gasket 340 or a workpiece (e.g., an aircraft antenna Aa or an aircraft skin As). This will often protect against the trapping of moisture in such area. While applicator 28 is shown, any of the systems shown may be used. The mix will cure in place as a sealant with the properties of the mixes disclosed in this application, including clarity.

Figure 26A:
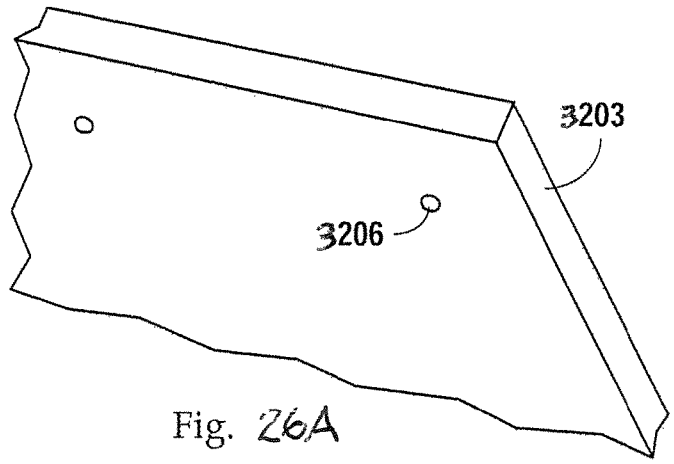
FIGS. 26A, 26B, 26C, and 26D illustrate environments in which injectable material may be used in an aircraft.
Figure 26B:
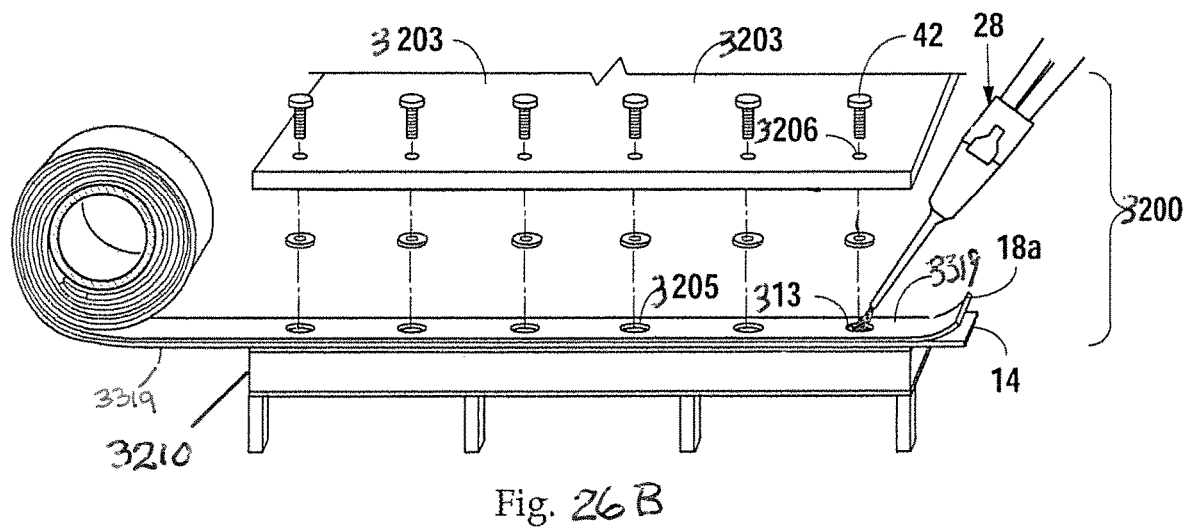
Figure 26C:
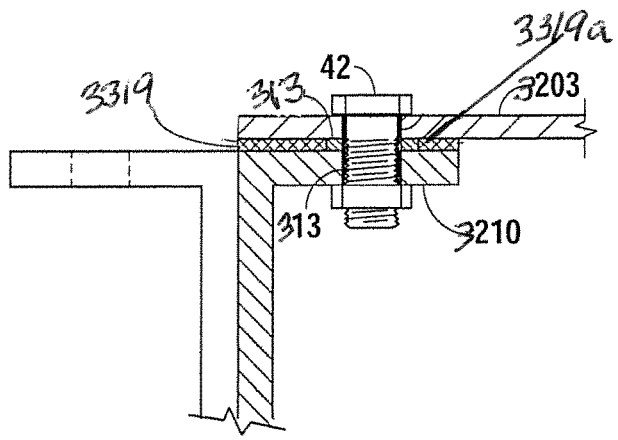

FIGS. 26A, 26B, and 26C illustrate a floorboard assembly 3200, which includes a floorboard 3203 mounted to a mounting member 3210, the floorboard and mounting member may be in one embodiment parts of an aircraft. Floorboard 3203 may have holes 3206 for receipt of fasteners 42. Fasteners 42 may be torqued down with a tape 3319 between the floorboards and mounting frame 3210. Tape 3319 may include a skeleton 3319a (see FIG. 26C). In one embodiment, tape 3319 may have cut out holes 3205 for receipt of two-part sealant mix 313 of polyurea as seen FIG. 25B. If sealant mix 313 is used, it may be any sealant and, in one embodiment, polyurea that is curable upon mixing and, in one embodiment self-leveling.

Figure 26D:
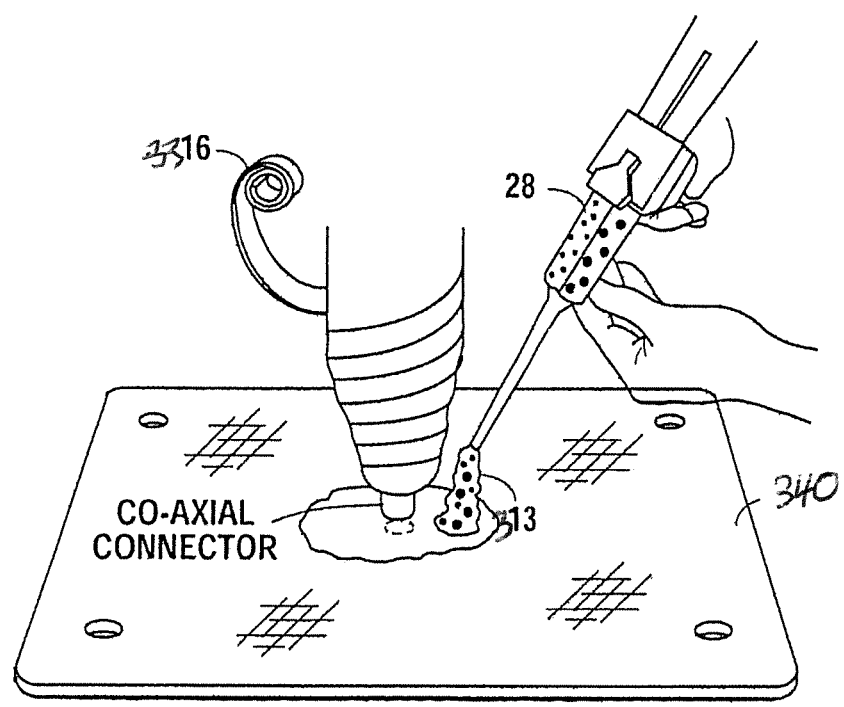

FIG. 26D illustrates application of Applicant's polyurea as a self-leveling, injectable, cure-in-place mix 313 with other sealing components. In particular, injectable, cure-in-place mix is being applied from an applicator 28 to a gasket 340 to seal off a connector that is wrapped in a polyurea tape 3316 (in some embodiments, with a stretchable skeleton, such as encapsulated open cell foam).

Figure 27:
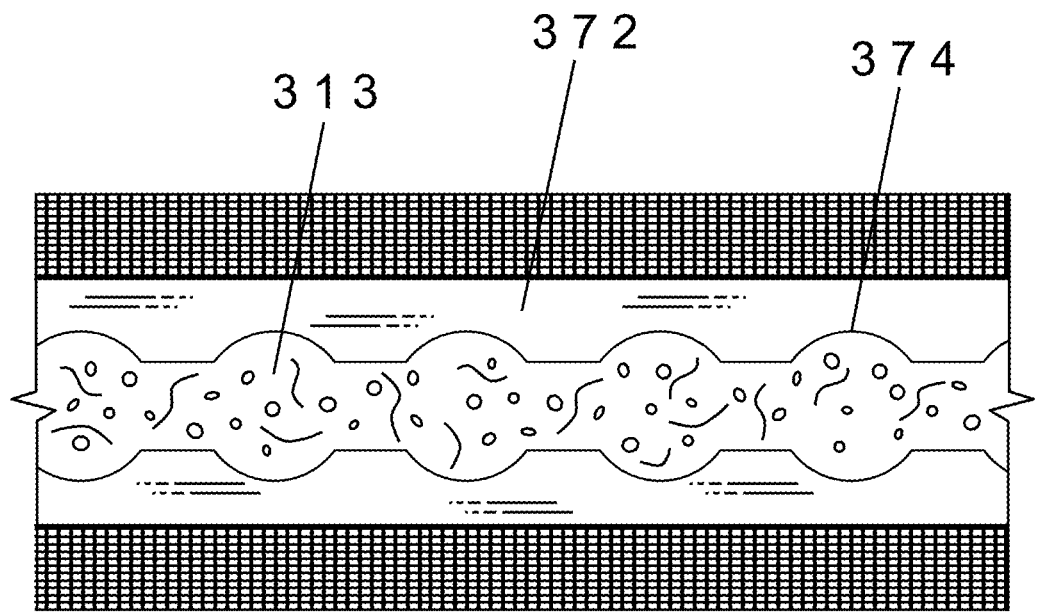
FIG. 27 illustrates another example use of an injectable sealant.

FIG. 27 illustrates another application of injectable sealant mix 313. In this implementation, sealant 313 has been applied to an aircraft seat track 372. Seat track 372 may, for example, be made of an aluminum alloy and, as illustrated, includes a channel 374 in which lower mounts for aircraft seats may be inserted and adjusted. Without some type of sealant, channel 374 may remain open and catch debris. Sealant 313 may be applied from a two-part applicator to channel 374. Due to its viscosity, sealant 313 may self-level (e.g., fill the cavity from the bottom up). Depending on how much sealant is applied, sealant 313 may fill all or part of channel 374. After application, sealant 313 will cure (e.g., form in place) in channel 374, forming a seal to the sides and bottom of the channel. In some embodiments, it may have the properties, including clarity of the other mixes disclosed herein.

Applicant's sealants have a variety of other applications. For example, sealants may be used as a patch, a gap filler, seat track filler (see FIG. 27), or a perimeter seal (e.g., internal or external). For instance, any sealant may be patched using the cure-in-place mix. For example, if portions of a first piece need to be repaired (e.g., cleaned, replaced, etc.), the sealant coat may be removed where the repair needs to be made. (The existing sealant coat may have been applied by manually-operated applicator, sprayable applicator, brush, etc.) Once the repair is made, a sealant may be applied to the at the removed area. The applied sealant will bond to surface of the first and the existing sealant coat.

Figure 29A:
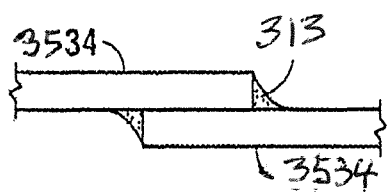
FIGS. 29A, 29B, and 29C illustrate the use of Applicant's sealant on adjacent panels of an aircraft or other vehicle.
Figure 29B:
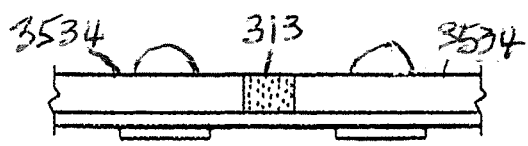
Figure 29C:
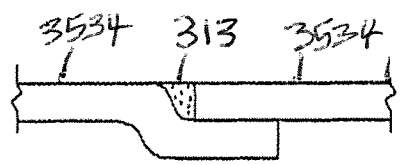

FIGS. 29A, 29B and 29C illustrate the use of Applicant's sealant injectable sealant 313 with adjacent panels 3534. Panels 3534 may be any structural panels on any assembly, but in one embodiment may be aluminum or aluminum alloy panels of an aircraft exterior or interior. For example, FIG. 29A shows to a pair of panels 3534 in a lap joint configuration at the exterior lap joint and the interior or inner lap joint where a polyurea bead or perimeter seal may be applied. Note that in this embodiment, as in others, the use of the gasket between the faying surfaces is optional. FIGS. 29B and 29C illustrate the use of Applicant's sealant 313 between the faces of adjacent, but spaced apart, panels 3534. Here, as in other locations, Applicant's perimeter seal provides an effective environmental seal protecting the joints from corrosive elements.

In certain implementations, sealant coat mixes may be used as a gap sealer (see, for example, FIGS. 29A-29C). For instance, sealant coat may be used between two pieces of tape, between floorboard pieces 3534 that do not align correctly, on door thresholds, and/or on cargo bay tie-downs. Sealant mixes may be applied up to several inches thick in these applications, by any of the flow or spray applications disclosed in this application, but are typically manually injected using applicator 28.

The sealant coating in preferred embodiments is non-opaque or clear, in particular embodiments optically clear or visually clear, so as to view any potential cracks, corrosion, or fatigue that may occur on the coated parts. The coated parts, in some embodiments, may be an aluminum alloy, such as 2024, 6061, 5056 or any other suitable alloy.

The compositions of the present invention may be applied to a variety of substrates, including, in addition to those set forth above: aluminum, aluminum alloy, carbon fiber reinforced plastics, and other composites. The injectable or sprayable composition of the present invention can be applied directly onto the surface of a substrate or over an under layer or previously applied coating (e.g, a sprayed-on polyurea).

Figure 28:
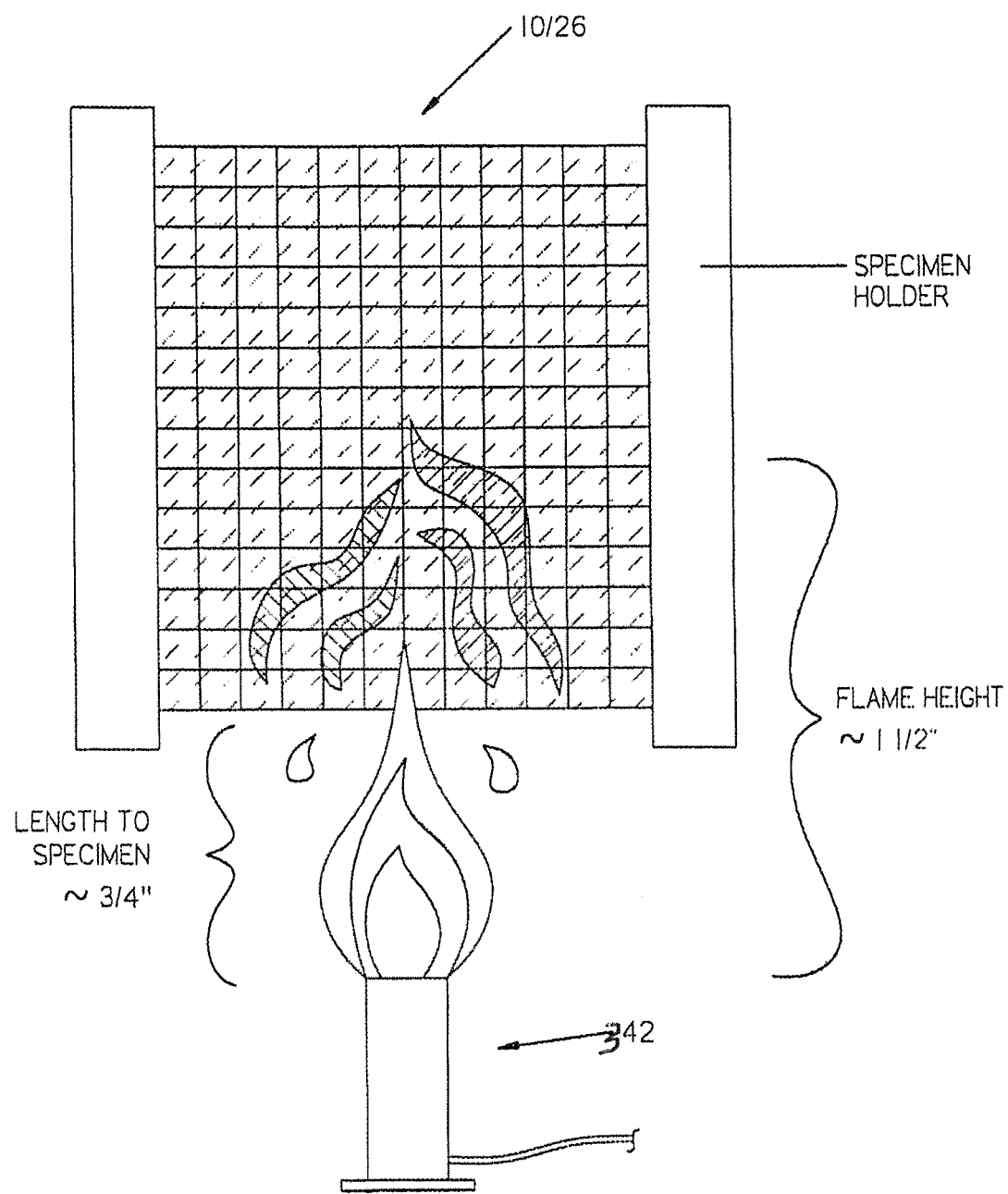
FIG. 28 illustrates a flammability test for a sealant coating.

Flame retardant tests may be performed according to one or more standards. For example, in particular implementations, a vertical burn test may be conducted pursuant to FAR 28.853 Appendix F, part I, (a), 1, (ii): 12 sec. (same as ABO 0031) (see FIG. 28 for apparatus and test setup illustration).

The vertical burn test is used for cabin and cargo compartment materials on aircraft and may utilize a Bunsen burner 342. This test is intended for use in determining the resistance of materials to flame when testing according to 60 second and 12 second vertical Bunsen burner tests as specified in FAR 25.853 and FAR 25.855. Ignition time is the length of time the burner flame is applied to the specimen 10/26 and may be either 60 or 12 seconds for this test. The flame time is the time in seconds that the specimens continue to burn after the burner flame is removed from beneath the specimen. Surface burning that results in a glow but not in a flame is not included. Drip flame time is the time in seconds that any flaming material continues to flame after falling from the specimen to the floor of the chamber. If no material falls from the specimen, the drip flame time is reported to be zero seconds and the notation "No Drip" is also reported. Burn length is the distance from the original specimen edge to the farthest evidence of damage to the test specimen due to that area's combustion including areas of partial combustion, charring or embrittlement, but not including areas sooted, stained, warped or discolored, nor areas where material has shrunk or melted away from the heat. The SF2470 two-part mix passes the Flame Retardant test.

Although the invention has been described with reference to specific embodiments, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

The invention claimed is:

1. A method for sealing a surface of an aircraft part, the method comprising the steps of:
    selecting a two component polymer sealant that will cure in less than 24 hours at 75° F. and will be clear upon curing to a peel strength of between 0.5 and 35 piw, 90-degree peel back;
    providing a system having a spray tip for combining the two components and immediately emitting from the spray tip an atomized spray comprising the combined components;
    applying to a painted or primed aluminum alloy aircraft part a first course of polymer sealant to a thickness of between 1 and 30 mil; and,
    applying a subsequent course at room temperature, to the first course, within 2.5 hours or less of applying the first course to a thickness of between 1 and 30 mil.

2. The method of claim 1 wherein the applying steps are performed at a distance within 6-12" from the aircraft part, measured from where the atomized spray is emitted.

3. The method of claim 1 further including the step of adjusting an air or fluid flow in the system.

4. The method of claim 1 further involving the step of adjusting, during the applying steps, a speed of the spray tip as it moves with respect to the aircraft part so as to control the thickness of the polymer sealant.

5. The method of claim 1 further including the step of determining, prior to applying, whether the surface of the aircraft has received a polymer sealant.

6. The method of claim 1 wherein the system of the providing step includes a cartridge with the two polymer components and a mixing straw.

7. The method of claim 1 wherein the polymer sealant of the selecting step is free of Volatile Organic Components (VOC).

8. The method of claim 1 wherein the polymer sealant of the selecting step passes the 12-second vertical burn test.

9. The method of claim 1 wherein the polymer sealant of the selecting step is resistant to degradation by Jet A fuel.

10. The method of claim 1 wherein the polymer sealant of the selecting step undergoes a color change while curing.

11. A method for sealing a surface of an aircraft part, the method comprising the steps of:
- selecting a two component polymer sealant that will cure in less than 24 hours at 75° F. and will be clear upon curing to a peel strength between 0.5 and 35 piw, 90-degree peel back;
- providing a system having a spray tip for combining the two components and immediately emitting from the spray tip an atomized spray comprising the combined components;
- applying to a painted or primed aluminum alloy aircraft part a first course of polymer sealant to a thickness of between 1 and 30 mil;
- applying a subsequent course at room temperature, to the first course, within 2.5 hours or less of applying the first course to a thickness of between 1 and 30 mil;
- wherein the polymer sealant is free of Volatile Organic Components (VOC);
- wherein the polymer sealant passes the 12-second vertical burn test; and,
- wherein the polymer sealant is resistant to degradation by Jet A fuel.

12. The method of claim 11 further comprising the step of determining, prior to applying, whether the surface of the aircraft has received a polymer sealant.

13. A method for sealing a surface of an aircraft part, the method comprising the steps of:
- selecting a two component polymer sealant that will cure in less than 24 hours at 75° F. and will be clear upon curing to a peel strength between 0.5 and 35 piw, 90-degree peel back;
- providing a system having a spray tip for combining the two components and immediately emitting from the spray tip an atomized spray comprising the combined components;
- applying to a painted or primed aluminum alloy aircraft part a first course of polymer sealant to a thickness of between 1 and 30 mil;
- applying a subsequent course at room temperature, to the first course, within 2.5 hours or less of applying the first course to a thickness of between 1 and 30 mil;
- wherein the polymer sealant is free of Volatile Organic Components (VOC);
- wherein the polymer sealant passes the 12-second vertical burn test;
- wherein the polymer sealant is resistant to degradation by Jet A fuel; and,
- wherein the system of the providing step includes a cartridge with the two polymer components and a mixing straw.

14. A method for sealing a surface of an aircraft part, the method comprising the steps of:
- selecting a two component polymer sealant that will cure in less than 24 hours at 75° F. and will be clear upon curing to a peel strength between 0.5 and 35 piw, 90-degree peel back;
- providing a system having a spray tip for combining the two components and immediately emitting from the spray tip an atomized spray comprising the combined components;
- applying to a painted or primed aluminum alloy aircraft part a first course of polymer sealant to a thickness of between 1 and 30 mil; and,
- applying a subsequent course at room temperature, to the first course, within 2.5 hours or less of applying the first course to a thickness of between 1 and 30 mil;
- wherein the applying steps are performed at a distance within 6-12" from the aircraft part, measured from where the atomized spray is emitted;
- further including the step of adjusting an air or fluid flow in the system; and,
- further involving the step of adjusting, during the applying steps, a speed of the spray tip as it moves with respect to the aircraft part so as to control the thickness of the polymer sealant.

15. The method of claim 14 further comprising the step of determining, prior to applying, whether the surface of the aircraft has received a polymer sealant.

16. The method of claim 1 wherein aluminum alloy aircraft part of the applying step is selected from the following group: chemical toilets, under-lavatories, lavatory pans, aircraft interiors, forward or aft entry doors, shear plates, the top of floorboards, any area where chaffing may occur and between faying surface.

17. The method of claim 1 wherein the polymer sealant of the selecting step has a cured hardness of 20-80 Shore A.

* * * * *